United States Patent
Zhang et al.

(10) Patent No.: US 12,258,278 B1
(45) Date of Patent: Mar. 25, 2025

(54) METHOD FOR PREPARING ORGANIC-INORGANIC HIERARCHICAL ZSM-5

(71) Applicant: Inner Mongolia University of Technology, Hohhot (CN)

(72) Inventors: Yongfeng Zhang, Hohhot (CN); Zhifei Hao, Hohhot (CN); Xingyuan Liu, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 0 days.

(21) Appl. No.: 18/817,272

(22) Filed: Aug. 28, 2024

(30) Foreign Application Priority Data

Sep. 6, 2023 (CN) .......................... 202311144799.7

(51) Int. Cl.
  *C01B 39/38* (2006.01)
  *B01J 20/16* (2006.01)
  *B01J 20/30* (2006.01)

(52) U.S. Cl.
  CPC ............ *C01B 39/38* (2013.01); *B01J 20/165* (2013.01); *B01J 20/3021* (2013.01); *B01J 20/3071* (2013.01); *B01J 2220/46* (2013.01)

(58) Field of Classification Search
  CPC ..... C01B 39/38; B01J 20/165; B01J 20/3021; B01J 20/3071; B01J 2220/46
  USPC ........................................................ 423/709
  See application file for complete search history.

(56) References Cited

FOREIGN PATENT DOCUMENTS

| CN | 105948818 A | 9/2016 |
| CN | 110589849 A | * 12/2019 |
| CN | 114394605 A | * 4/2022 |
| JP | 2000202282 A | 7/2000 |
| WO | 2022165911 A1 | 8/2022 |

OTHER PUBLICATIONS

Shudan Chi, et al., Porous molecular sieve polymer composite with high CO2 adsorption efficiency and hydrophobicity, Separation and Purification Technology, 2023, pp. 1-10, vol. 307, 122738.

Huijuan Liu, et al., Enhancing adsorption capacities of low-concentration VOCs under humid conditions using NaY@meso-SiO2 core-shell composite, Chemical Engineering Journal, 2022, pp. 1-8, vol. 442, 136108.

Wenting Li, et al., Porous Single Crystals at the Macroscale: From Growth to Application, Accounts of Chemical Research, 2023, pp. 374-384, vol. 56.

Roberto Millini, et al., Hybrid organic-inorganic zeolites: status and perspectives, Catalysis Science &Technology, 2016, pp. 2502-2527, vol. 6.

Xingyuan Liu, et al., Enhanced hydrophobic ZSM-5 with high capacity for toluene capture under high-humidity conditions, Science of the Total Environment, 2023, pp. 1-10, vol. 894, 164919.

Xiuhong Meng, et al., Mass Transfer Behavior of Benzene in Hierarchically Structured ZSM-5, frontiers in Chemistry, 2019, pp. 1-7, vol. 7 No. 502.

Xiaolin Luo, et al., ZSM-5@MCM-41 composite porous materials with a core-shell structure: Adjustment of mesoporous orientation basing on interfacial electrostatic interactions and their application in selective aromatics transport, Separation and Purification Technology, 2020, pp. 1-9, vol. 239, 116516.

* cited by examiner

*Primary Examiner* — Edward M Johnson
(74) *Attorney, Agent, or Firm* — Bayramoglu Law Offices LLC

(57) ABSTRACT

An organic-inorganic hierarchical ZSM-5, a preparation method thereof, and an application thereof are provided. The preparation method for the organic-inorganic hierarchical ZSM-5 includes the following steps: mixing a silicon source, an aluminum source, NaOH, and water, stirring the mixture until uniformly dispersed, and drying and grinding the mixture to obtain a hierarchical ZSM-5 precursor; mixing the hierarchical ZSM-5 precursor, sodium silicate, seed, ethanol, and water, and uniformly dispersing the mixture to obtain a crystallized solution; mixing the crystallized solution with a hydrolyzed organosilane to obtain a first solution; subjecting the first solution to hydrothermal crystallization at 160-180° C. for 48-72 h to obtain a second product; and washing and drying the second product to obtain the organic-inorganic hierarchical ZSM-5. The organic-inorganic hierarchical ZSM-5 prepared by the present invention maintains stable toluene adsorption within a humidity range of 30%, and has good cyclic adsorption.

4 Claims, 21 Drawing Sheets

METHOD FOR PREPARING ORGANIC-INORGANIC HIERARCHICAL ZSM-5

CROSS REFERENCE TO THE RELATED APPLICATIONS

This application is based upon and claims priority to Chinese Patent Application No. 202311144799.7, filed on Sep. 6, 2023, the entire contents of which are incorporated herein by reference.

TECHNICAL FIELD

The present invention belongs to the technical field of molecular sieves, and in particular relates to an organic-inorganic hierarchical ZSM-5, a preparation method therefor and an application thereof.

BACKGROUND

The availability of advanced materials with new characteristics and properties is a necessary condition for progress in all technical fields (W. Li, et al. American Chemical Society, 2023, 56: 374-384). This is especially true for zeolite molecular sieves and related microporous solids (S. Chi, et al. Separation and Purification Technology, 2023, 307: 122738), which are widely used in heterogeneous catalysts, adsorbents/separators, ion exchangers, etc. In addition to these classic uses, these materials have potential advanced application values in the optical field such as sensing, optics and medicine due to their special crystal chemical properties. In petrochemical industry, pharmaceutical industry, sewage treatment and various environmental issues, previous studies have proved at present in the synthesis, characterization and application of zeolite molecular sieves that these materials are multifunctional (H. Liu, et al. Chemical Engineering Journal, 2022, 442: 136108), and they can be modified in terms of structure and composition.

Structurally, the pores are defined as micropores, mesopores and macropores depending on their different sizes. A hierarchical structure refers to micropores-mesopores or a combination of various pore channels. In the research of catalytic cracking or adsorption separation of different substances, etc., the hierarchical structure has been verified to play a positive role in the performance of materials because it can significantly enhance the mass transfer effect. At present, preparation methods for hierarchical zeolite molecular sieves are nothing more than three categories-post-treatment, template methods, and emerging solid phase methods. Post-treatment methods include composite method of various materials, atom (Si or Al) removal method, and silanization treatment. Template methods include a soft template method, a hard template method, and a double template method. In the post-treatment method, the composite method of various materials is simply known as "splicing" and "coating" of various materials, and the preparation process thereof is relatively tedious. The atom removal method causes non-negligible damage to the skeleton of materials, accompanied by also environmental pollution caused by the use of a strong acid and alkali. A common practice is desilication by an alkali treatment, which means that an ordered material skeleton is stripped of certain atoms to form vacant holes, whereby pores are thus formed. In addition, dealumination by an acid treatment is also carried out to achieve a similar effect. Silanization treatment also brings about disturbing environmental and cost problems. Organosilylation is the layered growth of mesopores by forming covalent bonds between the organosilane and the surface of a material. Generally, the post-treatment method is accompanied by pollution, cost and performance problems and thus has certain limitations. In contrast, the template method has been widely studied in recent years. The soft template method refers to the use of a specific surfactant or colloid to self-assemble in a selective solvent to form a template. The "fragments" of the target material to be prepared will be absorbed to the surface of the self-assembled structure. The desired product is obtained by a sol-gel method, and the template is then removed by means of extraction, calcination, etc., so as to obtain the designed hierarchical material. In addition, recent experimental studies have indicated that some scholars have achieved certain effects by using surfactants combined with alkali treatment to prepare hierarchical molecular sieves; however, the preparation process is inevitably complicated. The hard template method is realized by the "normative" growth of a material from a precursor in a pre-prepared rigid template. Specifically, it plays a guiding and supporting role. The double template method is a method by which a hierarchical molecular sieve is obtained by using a variety of template agents that can function to guide the growth of various pore channels during synthesis. Generally, the template method has a series of shortcomings, such as expensive reagents used, environmental pollution, complex technology, and the need for high-temperature calcination for removal, which still cannot be overcome at present. In addition, at present, researchers have made an attempt to synthesize hierarchical molecular sieves in a green manner by a solid phase method, but it is still inevitable that a small amount of template agent is required in some experiments. In addition, in the latest research, some scholars have made an attempt to use seeds instead of organic template agents to guide the growth of materials; however, without exception, the preparation process thereof still requires high-temperature roasting to "strengthen" its porous structure. In addition, an attempt has also been made to use seed induction for green synthesis instead of a template agent; however, without exception, high-temperature roasting is needed. In a word, the current methods have three problems that cannot be ignored: a complex preparation process, a high cost, and environmental pollution.

In terms of composition, a superior combination of organic and inorganic components brings a good thermal stability and mechanical stability; moreover, it has the characteristics of typical flexibility and easy functionalization of organic groups, which has attracted increasing interest in the potential application of advanced technologies (R. Millini, et al. Catalysis Science & Technology, 2016, 6:2502). Literatures have reported that organic-inorganic hybrid materials belong to class I, i.e., materials in which when an organic phase is only embedded in an inorganic matrix, there is a weak interaction (van der Waals force or hydrogen bonding) between the two components. In type II, organic and inorganic components interact through covalent bonds, resulting in close binding at the molecular level. In addition, in various studies, an organic-inorganic hybrid zeolite molecular sieve refers to a material that belongs to class II, in which covalent binding of an organic group to an inorganic framework occurs by zeolite molecular sieve pre-formation, followed by group introduction, or by direct introduction during the hydrothermal crystallization of a microporous solid. In these two cases, it is necessary to use specific precursors of organic and inorganic components containing covalent bonds. The advantage of these precursors lies in the high universality of organic groups, which provides sufficient possibilities for the preparation of organic-inorganic hybrid molecular sieves with characteristic properties. At present, the preparation of organic-inorganic hybrid microporous molecular sieves is mainly divided into two categories, i.e., in-situ synthesis and post-treatment. In-situ synthesis methods include hydrothermal synthesis, mixed solvent hydrothermal method, microwave-assisted hydrothermal method, dry gel conversion method, and solvent-free synthesis method. However, compared with mesoporous organic-inorganic hybrid molecular sieves, there are few studies on the preparation of microporous organic-inorganic molecular sieves in the past. The introduction of organic groups by adding organic sources during the synthesis of zeolite molecular sieves is facing the most critical problem-low crystallinity or crystal transformation, which greatly hinders the development in this direction.

Among numerous zeolite molecular sieves with diverse structural characteristics, a ZSM-5 molecular sieve is relatively familiar and had been maturely developed. In 1972, US Mobil Company for the first time synthesized the first very important member-ZSM-5 molecular sieve—of the "Pentasil" family. The structure of ZSM-5 has a pore type with double ten-membered ring cross pore channels. It belongs to the orthorhombic crystal system, and the adjustable range of the ratio of silicon to aluminum is wide, so it can achieve all-silicon type (Silicalite-1 type) and belongs to MFI molecular sieves. It is composed of the following two types of pore channels in a cross manner: zigzag pore channels with an elliptical cross section and straight channels with an elliptical cross section. The ZSM-5 molecular sieve has excellent thermal stability, ion exchange ability, catalytic oxidability and selective adsorption (X. Luo, et al. Separation and Purification Technology, 2020, 239:116516). These characteristics make it widely used and studied in the fields of catalytic cracking of petroleum oil, sewage treatment, and adsorption and separation of substances. In particular, the ZSM-5 molecular sieve has a broad development prospect in the catalytic oxidation and adsorption separation of VOCs. Facing the problem of containing water during the adsorption of VOCs, the ZSM-5 molecular sieve lost its adsorption capacity due to its hydrophilicity causing competitive adsorption of VOCs and water molecules. In numerous studies, the most widely used modification techniques for the ZSM-5 molecular sieve are almost all post-treatment for grafting of organic groups. Among them, the most significant characteristic of silanization modification (i.e., post-treatment for grafting with organic groups on the surface thereof) is that it causes the collapse of the ZSM-5 molecular sieve skeleton. This method harms the pore characteristics of the ZSM-5 molecular sieve per se as a porous solid material, and greatly compromises the key role played by its skeleton structure while changing its surface properties, so it has certain limitations. In addition, the other post-treatment methods also have shortcomings, such as a high cost, environmental pollution, and a complex process. Therefore, there is a need to develop an in-situ synthesis method that preserves the pore structure characteristics to the greatest extent, reduces the process difficulty and alleviates pollution.

In view of the above discussions, how to combine a "hierarchical" structure with a "green and mild preparation method" and further introduce organic hydrophobic components, simplify the process, reduce pollution and reduce costs is concerned.

SUMMARY

In view of the shortcomings in the prior art, an object of the present invention is to provide a method for preparing an organic-inorganic hierarchical ZSM-5. The preparation method is carried out in an ethanol-water system.

Another object of the present invention is to provide an application of the above-mentioned organic-inorganic hierarchical ZSM-5 in improving toluene adsorption and water resistance.

The object of the present invention is achieved by the following technical solution.

The method for preparing the organic-inorganic hierarchical ZSM-5 includes the following steps:

S1. mixing a silicon source, an aluminum source, NaOH, and water, stirring the mixture until uniformly dispersed, and drying and grinding the mixture to obtain a hierarchical ZSM-5 precursor, wherein the ratio of the part by amount of substance of silicon in the silicon source to the part by amount of substance of aluminum in the aluminum source, to the part by amount of substance of NaOH, to the part by volume of water is (20-80):(1-4):(0.5-2):(35-55), wherein the unit of the part by amount of substance is mol, and the unit of the part by volume is mL, wherein in S1, the drying temperature is 60-100° C., and the drying time is 12-16 h;

S2. mixing the hierarchical ZSM-5 precursor, sodium silicate, seed, ethanol, and water, and uniformly dispersing the mixture to obtain a crystallized solution, wherein in parts by mass, the ratio of the hierarchical ZSM-5 precursor, sodium silicate, seed, ethanol and water in S2 is (1.5-3):(0.3-0.6):(0.06-0.12):(10-20):(30-60), wherein in S2, the seed is a ZSM-5 molecular sieve; and S3. mixing the crystallized solution with a hydrolyzed organosilane to obtain a first solution, subjecting the first solution to hydrothermal crystallization at 160-180° C. for 48-72 h to obtain a second product, and washing and drying the second product to obtain the organic-inorganic hierarchical ZSM-5, wherein in parts by mass, the ratio of the hydrolyzed organosilane to the hierarchical ZSM-5 precursor in the crystallized solution is (1-10):(1-7).

In S3, the organosilane is hexamethyldisilazane and/or methyltriethoxysilane.

In S3, the hydrolyzed organosilane is obtained by hydrolyzing an organosilane for 2-4 h.

In S3, a detergent used for the washing is a mixture of an alcohol and water.

In S3, the drying temperature is 60-105° C.

In S3, in parts by mass, the ratio of the hydrolyzed organosilane to the hierarchical ZSM-5 precursor in the crystallized solution is (1-5):(1-5).

In S3, the method for obtaining the hydrolyzed organosilane involves mixing 0.5-3 parts by mass of the organosilane with 8-15 parts by volume of water, and stirring the mixture at 20-30° C. for 2-4 h, wherein the unit of the part by mass is g, and the unit of the part by volume is mL.

An application of the above-mentioned organic-inorganic hierarchical ZSM-5 in improving toluene adsorption and water resistance.

Compared with the prior art, the beneficial effects of the present invention are as follows:

1. In the present invention, a hydrothermal synthesis method involving an ethanol-water system is used, wherein the ethanol-water system provides an environmental basis for the introduction of an organosilane. By adding an appropriate amount of the organosilane to the ethanol-water system, the organic-inorganic hierarchical ZSM-5 is synthesized in situ, which has intact rod-like crystal grains. The hierarchical ZSM-5 with methyl is obtained by adding the organosilane.

2. In a nitrogen physical adsorption-desorption curve of the organic-inorganic hierarchical ZSM-5 prepared by the present invention, an H4-type hysteresis loop, which is a combination of type-I and type-II adsorption isotherms, is a classic mixed structure of micropores and mesopores, and the organic-inorganic hierarchical ZSM-5 has a micropore range of 0.5-0.7 nm and a mesopore range of 3-4 nm.

3. The preparation method of the present invention does not need tedious post-treatment (the post-treatment is namely secondary processing or a complicated preparation process that needs to be artificially designed), and retains the intact skeleton structure and pore characteristics of the organic-inorganic hierarchical ZSM-5 per se; organotemplate-free synthesis is needed, thus reducing the cost and pollution; and compared with currently studied preparation steps for the green preparation of a hierarchical molecular sieve by a solid-phase grinding method, the use of an organic template agent is eliminated, no high-temperature roasting is required, and a mesoporous structure is successfully introduced.

4. In the preparation method of the present invention, the hydrophobic group methyl is introduced on the basis of the original material to synthesize the organic-inorganic hierarchical ZSM-5 in situ, the energy consumption is reduced, the diversity of material structure and performance is improved, and the preparation process is simplified.

5. The organic-inorganic hierarchical ZSM-5 prepared by the present invention maintains stable toluene adsorption within a relative humidity range of 30%, and has good cyclic adsorption.

DETAILED DESCRIPTION OF THE EMBODIMENTS

Figure 1:
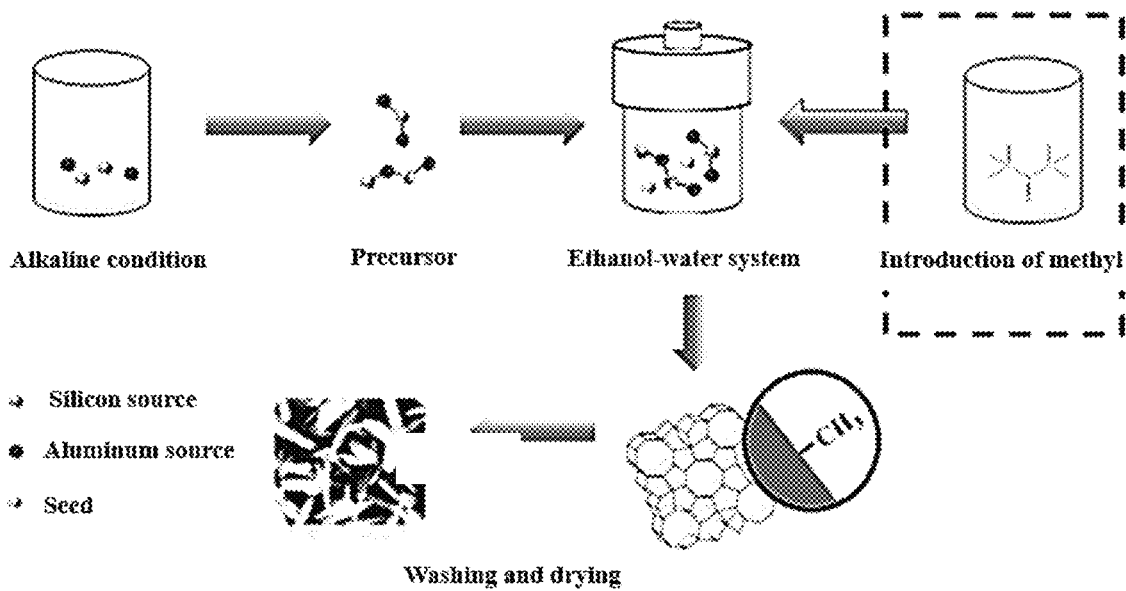
FIG. 1 is a schematic illustration of a method for preparing the organic-inorganic hierarchical ZSM-5.

The technical solution of the present invention will be further explained in conjunction with specific examples.

The raw materials involved in the following examples and their manufacturer information are as follows:

Seed: the powdered ZSM-5 molecular sieve purchased from Tianjin Kaite Xin Cailiao Youxian Gongsi, with a silicon-to-aluminum ratio of 50;

Information about the instruments and their models involved in the following examples is as follows:

Fourier transform infrared spectrometer: a device of model Nexus670 produced by US Nicolet Company has a scanning range of 4000-400 cm-1 and a resolution of 0.09 cm-1.

Model 3H-2000PS2 specific surface area and pore diameter analyzer produced by Bei Shide Instrument Technology (Beijing) Co., Ltd., is used for a nitrogen physical adsorption-desorption characterization test. Element distribution was characterized by Talos F200X field emission transmission electron microscope from US FEI company. The test conditions are accelerated voltage: 200 KV; magnification: 25-1030 K; point resolution: 0.24 nm; linear resolution: 0.102 nm; information resolution: 0.14 nm; sample inclination angle: <±30°; camera constant: 30-4500 mm; and electron gun: Schottky thermal field emission electron gun.

STA 449F3-QMS 402D-IS50 thermal analyzer from Germany Nech Company is used for thermal mass analysis. The test conditions are heating rate: 20° C./min; and gas atmosphere: $N_2$. The toluene adsorption test is carried out by VOC catalytic evaluation system from Beijing Builder Electronic Technology Co., Ltd. The carrier gas is adjusted to nitrogen, the required inlet toluene concentration is adjusted by purging toluene at room temperature and atmospheric pressure, the outlet gas is qualitatively and quantitatively analyzed by gas chromatography, the whole pipeline is sealed, and the humidity is adjustable.

The water in the following examples is deionized water.

The alcohol-water mixture in the following examples is a mixture of ethanol and water, and in parts by volume, the ratio of ethanol to water is 1:1.

Dry condition: the relative humidity is 0%.

Example 1

A method for preparing a hierarchical ZSM-5, including the following steps:

Step 1. mixing $SiO_2$, $NaAlO_2$, NaOH, and water, stirring the mixture until uniformly dispersed, drying the mixture in an electric blast drying oven at 100° C. for 16 h, and grinding the dried product to obtain a hierarchical ZSM-5 precursor (white powder), wherein the ratio of the part by amount of substance of Si in $SiO_2$ to the part by amount of substance of Al in $NaAlO_2$ to the part by amount of substance of NaOH to the part by volume of water was 40:1.92:1:55, wherein the unit of the part by amount of substance was mol, and the unit of the part by volume was mL; and Step 2. mixing the hierarchical ZSM-5 precursor, sodium silicate, seed, ethanol, and water, and uniformly dispersing the mixture to obtain a crystallized solution; placing the crystallized solution in a hydrothermal crystallization reaction kettle (sealed), and performing crystallization in a vacuum drying oven at 180° C. for 72 h, followed by natural cooling to obtain a first product; and washing the first product with an alcohol-water mixture to neutrality and drying same at 105° C. for 16 h to obtain the hierarchical ZSM-5, wherein in parts by mass, the ratio of the hierarchical ZSM-5 precursor, sodium silicate, seed, ethanol and water was 1.5:0.3:0.06:10:30.

Examples 2-4

As shown in FIG. 1, a method for preparing an organic-inorganic hierarchical ZSM-5, including the following steps:

Step 1. mixing $SiO_2$, $NaAlO_2$, NaOH, and water, stirring the mixture until uniformly dispersed, drying the mixture in an electric blast drying oven at 100° C. for 16 h (i.e., aging), and grinding the dried product to obtain a hierarchical ZSM-5 precursor (white powder), wherein the ratio of the part by amount of substance of Si in $SiO_2$ to the part by amount of substance of Al in $NaAlO_2$ to the part by amount of substance of NaOH to the part by volume of water was 40:1.92:1:55, wherein the unit of the part by amount of substance was mol, and the unit of the part by volume was mL;

S2. mixing the hierarchical ZSM-5 precursor, sodium silicate, seed, ethanol, and water, and uniformly dispersing the mixture to obtain a crystallized solution, wherein in parts by mass, the ratio of the hierarchical ZSM-5 precursor, sodium silicate, seed, ethanol and water in S2 was 1.5:0.3:0.06:10:30; and S3. mixing the crystallized solution with hexamethyldisilazane hydrolyzed for 4 h, and uniformly dispersing the mixture to obtain a first solution; placing the first solution in a high-temperature and high-pressure hydrothermal reaction kettle for hydrothermal crystallization at 180° C. for 72 h to obtain a second product; and washing the second product with an alcohol-water mixture and drying same at 105° C. for 16 h to obtain the organic-inorganic hierarchical ZSM-5, wherein in parts by mass, the ratio of the hexamethyldisilazane hydrolyzed for 4 h to the hierarchical ZSM-5 precursor in the crystallized solution was X.

The method for obtaining the hexamethyldisilazane hydrolyzed for 4 h involved: placing m grams of hexamethyldisilazane in 10 mL of deionized water, and stirring the mixture at 30° C. for 4 h.

| Example | X | m (unit: g) | No. |
| --- | --- | --- | --- |
| Example 2 | 1:3 | 0.5 | H0.5-ZSM-5 |
| Example 3 | 1:1 | 1.5 | H1.5-ZSM-5 |
| Example 4 | 5:3 | 2.5 | H2.5-ZSM-5 |

Examples 5-7

A method for preparing an organic-inorganic hierarchical ZSM-5, which was essentially the same as the preparation method for the organic-inorganic hierarchical ZSM-5 in Examples 2-4, only except that the "hexamethyldisilazane" in Examples 2-4 was replaced by "methyltriethoxysilane", and in parts by mass, the ratio of the methyltriethoxysilane hydrolyzed for 4 hours to the ZSM-5 precursor in the crystallized solution was Y.

The method for obtaining the methyltriethoxysilane hydrolyzed for 4 h involved: placing m grams of methyltriethoxysilane in 10 mL of deionized water, and stirring the mixture at 30° C. for 4 h.

| Example | Y | m (unit: g) | No. |
|---|---|---|---|
| Example 5 | 1:3 | 0.5 | T0.5-ZSM-5 |
| Example 6 | 1:1 | 1.5 | T1.5-ZSM-5 |
| Example 7 | 5:3 | 2.5 | T2.5-ZSM-5 |

Figure 2:
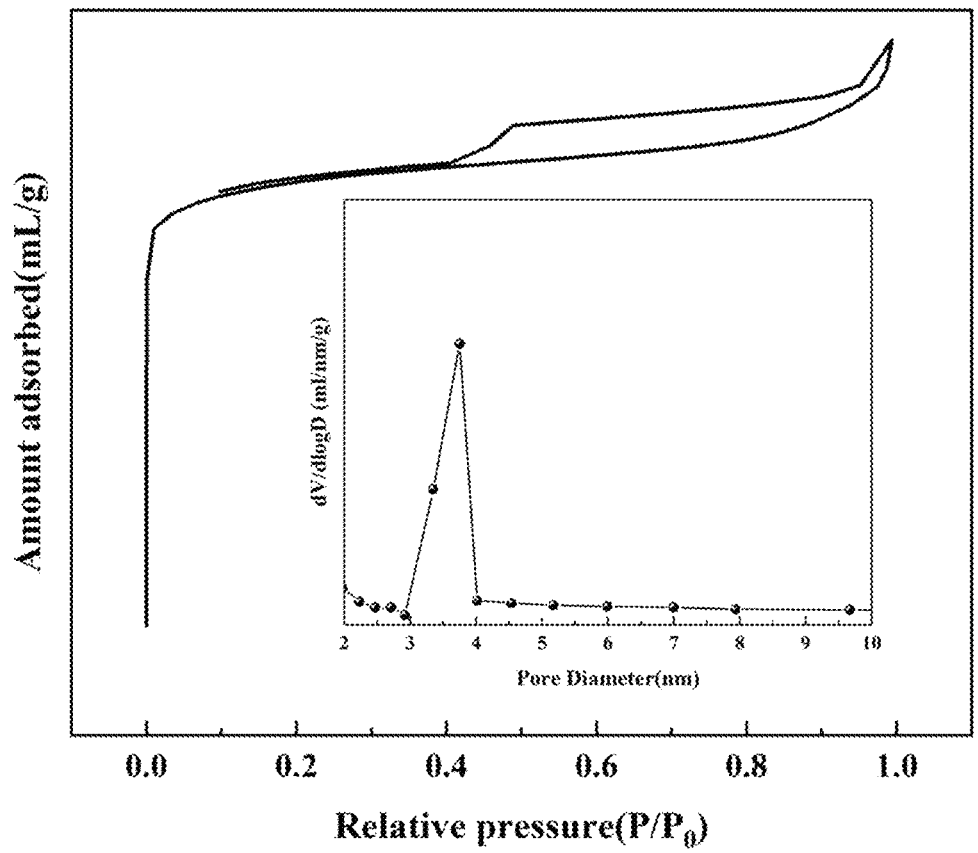
FIG. 2 is a nitrogen physical adsorption-desorption curve of the hierarchical ZSM-5 prepared in Example 1 and a pore diameter distribution in an inset thereof.

The pore structure characteristics of the hierarchical ZSM-5 prepared in Example 1 were as shown in FIG. 2, and the overall trend of the nitrogen physical adsorption-desorption curve of the hierarchical ZSM-5 prepared in Example 1 was presented as a type-I isothermal curve. An H4-type hysteresis loop was composed of type-I and type-II isotherms, and there was a very significant adsorption amount at the lower end of P/PO, which was related to micropore filling in the hierarchical ZSM-5 prepared in Example 1. The BJH pore diameter distribution diagram of the hierarchical ZSM-5 prepared in Example 1 showed the presence of 3-4 nm mesopores in addition to the unique microporous structure (0.53-0.58 nm) of the ZSM-5 molecular sieve. It could thus be judged that the pore structure of the hierarchical ZSM-5 prepared in Example 1 belonged to the micropore-mesopore combination type.

Figure 3A:
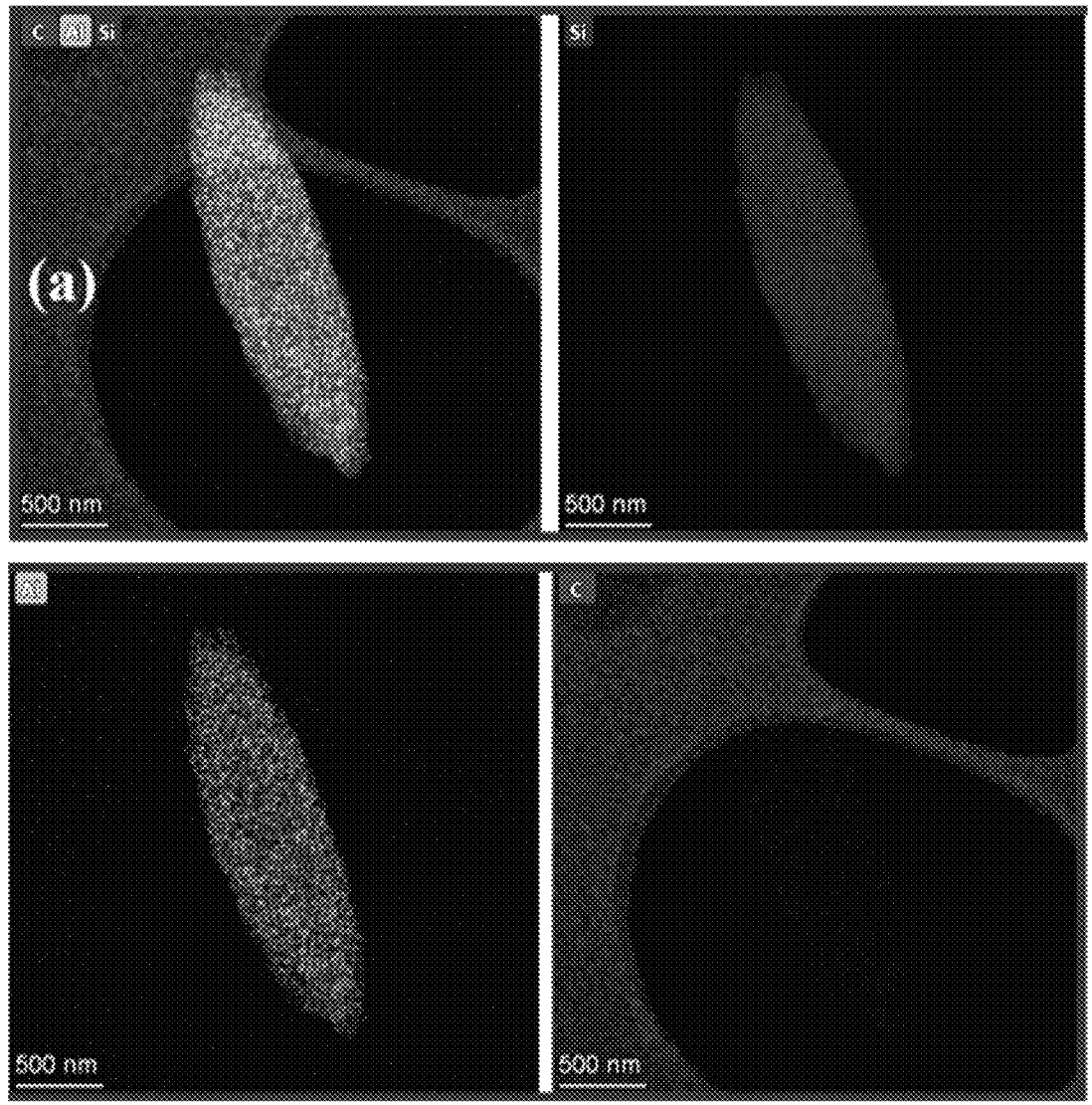
FIG. 3A is an element distribution diagram of the hierarchical ZSM-5 prepared in Example 1.
Figure 3B:
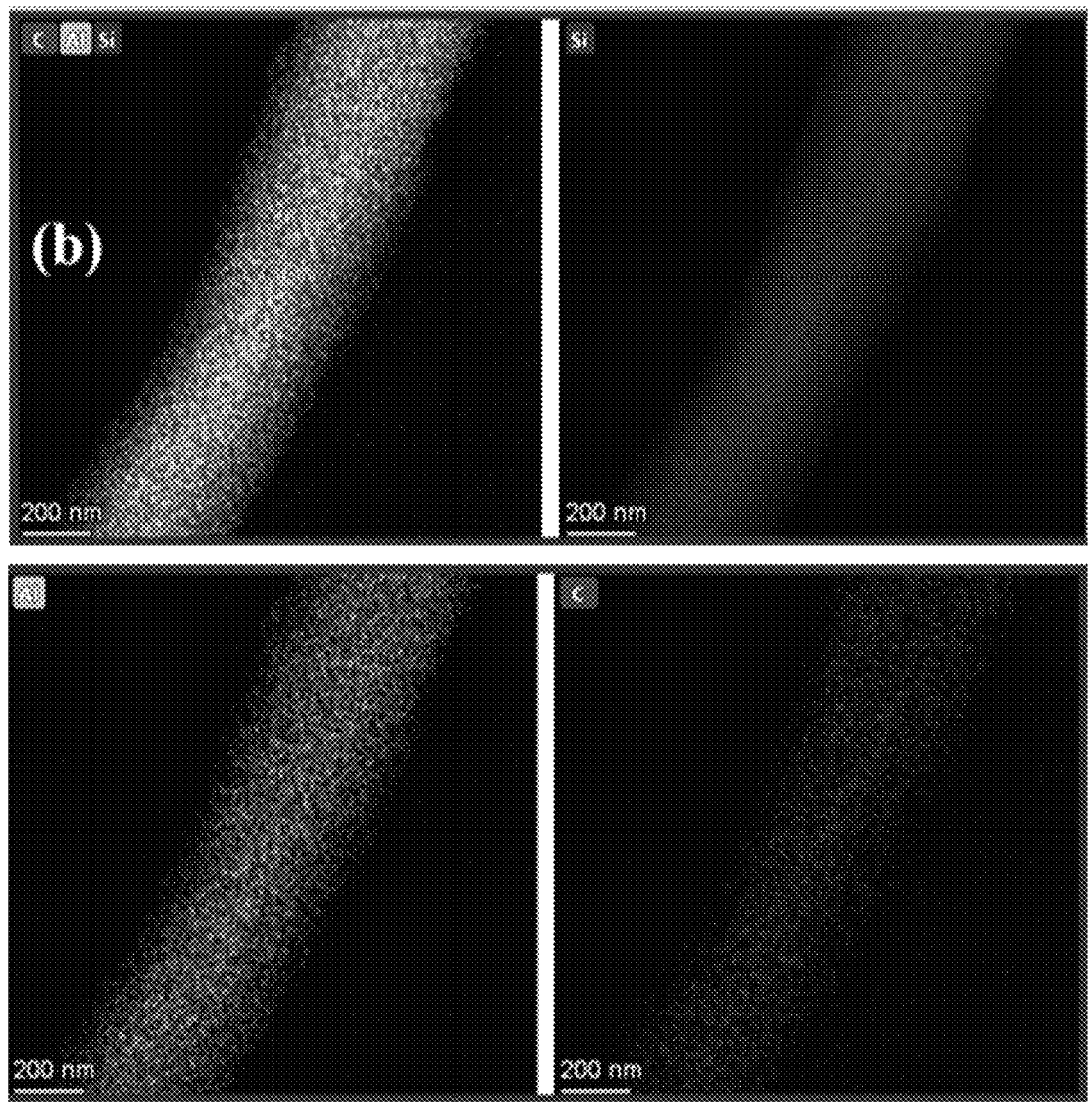
FIG. 3B is an element distribution diagram of the organic-inorganic hierarchical ZSM-5 prepared in Example 3.
Figure 3C:
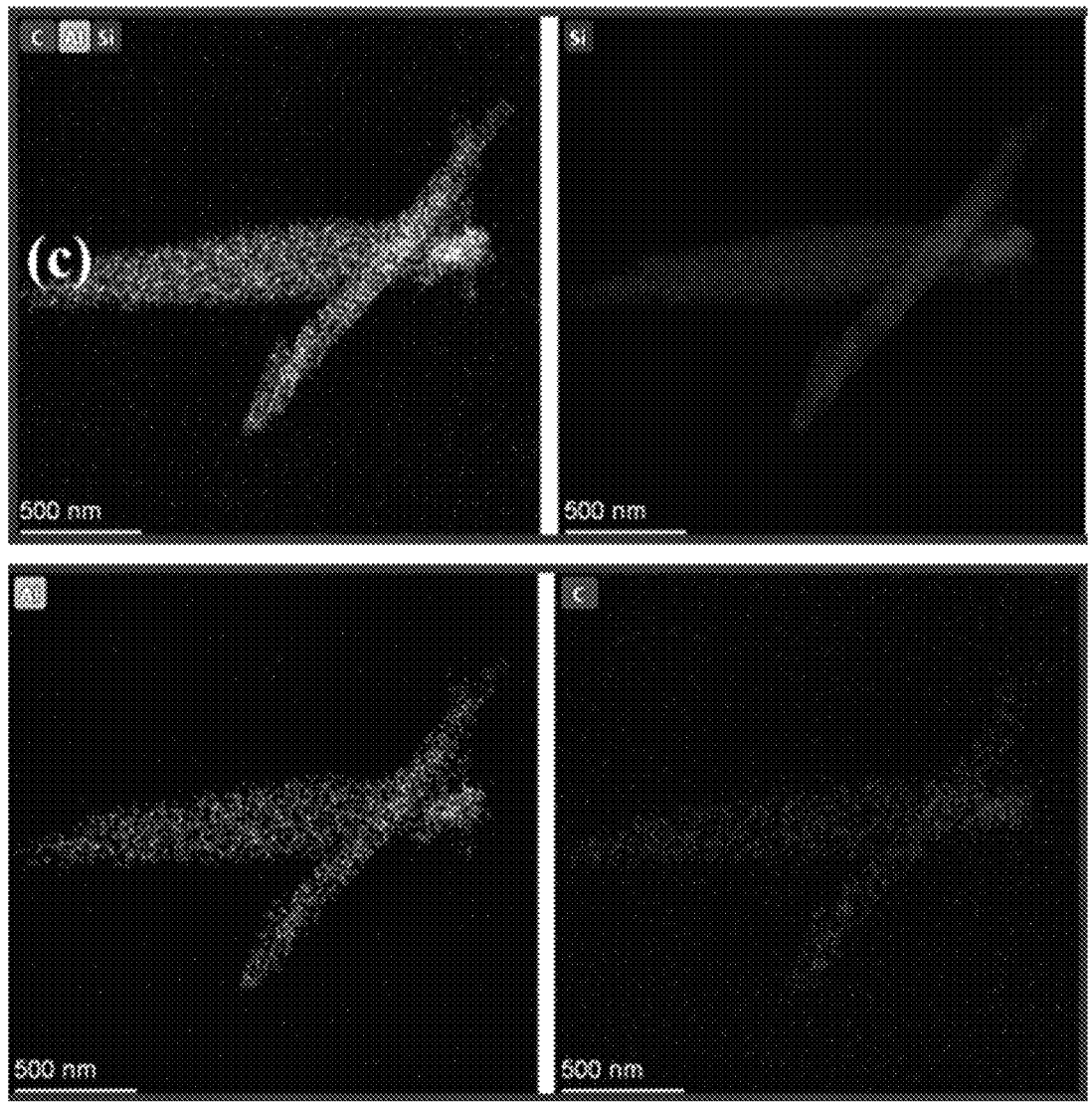
FIG. 3C is an element distribution diagram of the organic-inorganic hierarchical ZSM-5 prepared in Example 6.

FIGS. 3A-3C were an element distribution diagram of the hierarchical ZSM-5 prepared in Example 1, the organic-inorganic hierarchical ZSM-5 prepared in Example 3, and the organic-inorganic hierarchical ZSM-5 prepared in Example 6. It could be seen from FIG. 3A that the element distribution of the hierarchical ZSM-5 prepared in Example 1 had mainly Si and Al in addition to oxygen, and had no C (the distribution of the element C in the diagram was caused by the test environment). It could be seen from FIG. 3B that the element distribution of the organic-inorganic hierarchical ZSM-5 prepared in Example 3 had a substantial distribution of the element C in addition to Si and Al, indicating successful introduction of the organic group methyl. It could be seen from FIG. 3C that the element distribution of the organic-inorganic hierarchical ZSM-5 prepared in Example 6 showed a substantial distribution of the element C, indicating successful introduction of the organic group methyl.

Figure 4A:
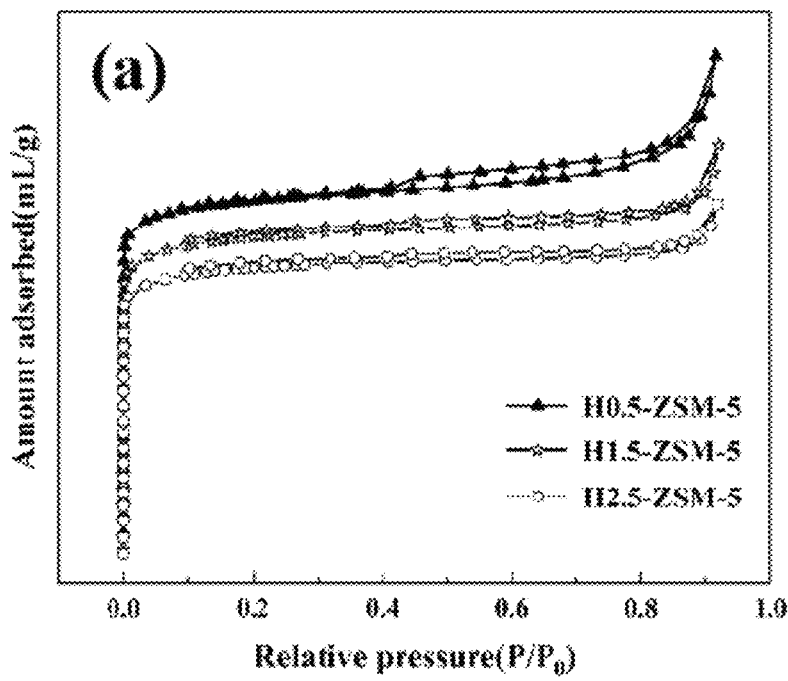
FIG. 4A is a nitrogen physical adsorption-desorption curve and FIG. 4B is a pore diameter distribution diagram of the organic-inorganic hierarchical ZSM-5 prepared in Examples 2-4.
Figure 4B:
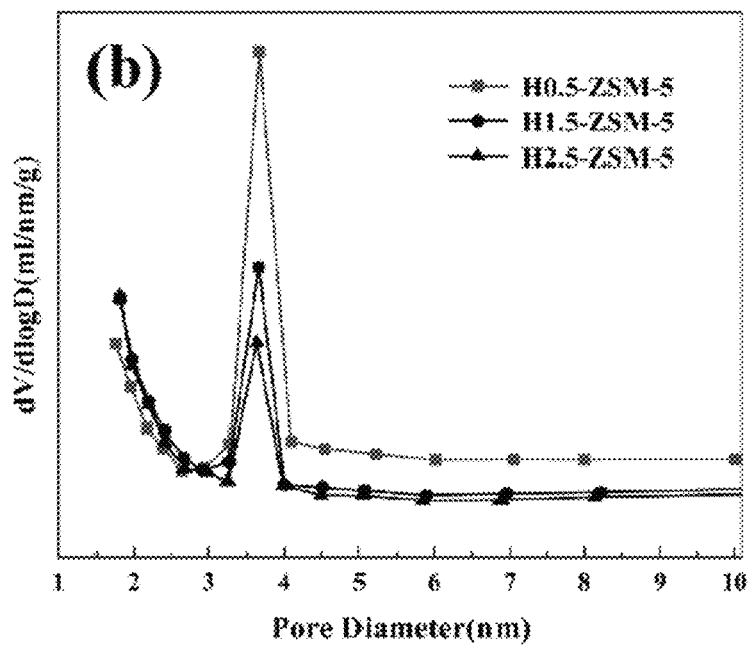

FIGS. 4A-4B were a nitrogen physical adsorption-desorption curve and pore diameter distribution diagram of the organic-inorganic hierarchical ZSM-5 prepared in Examples 2-4. FIG. 4A showed that the organic-inorganic hierarchical ZSM-5 prepared in Examples 2-4 (the ZSM-5 molecular sieve in which hexamethyldisilazane (HMDS) was introduced) still had a microporous-mesoporous structure, and the pore diameter distribution diagram corresponding thereto (FIG. 4B) showed that the organic-inorganic hierarchical ZSM-5 prepared in Examples 2-4 had a certain number of mesopores between 3-4 nm, and the organic-inorganic hierarchical ZSM-5 prepared in Example 3 (H1.5-ZSM-5) had the largest number of micropores and moderate mesopores.

Figure 5A:
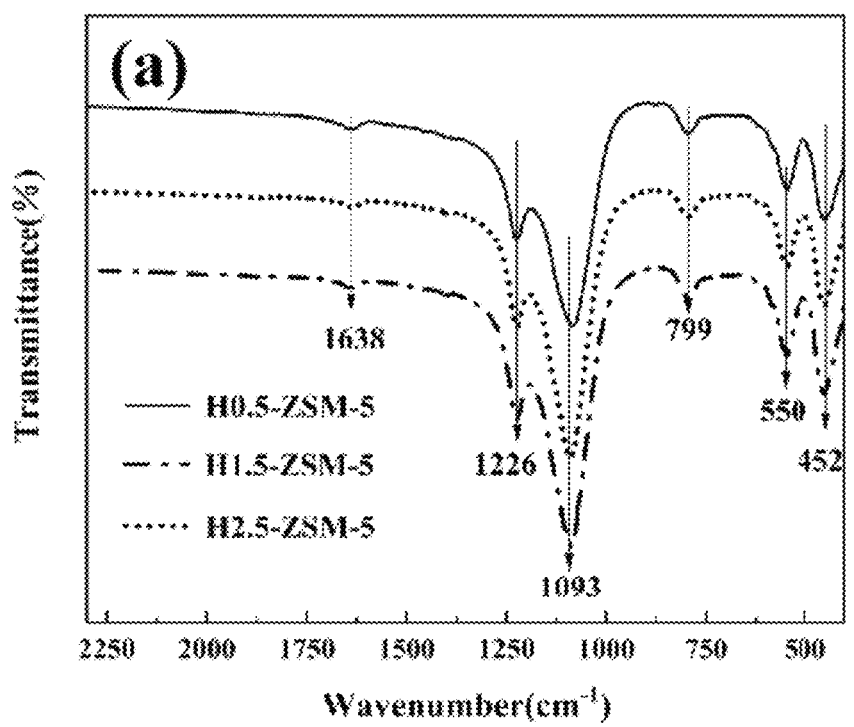
FIG. 5A is an infrared spectrum and FIG. 5B is an infrared spectrum of the organic-inorganic hierarchical ZSM-5 prepared in Examples 2-4.
Figure 5B:
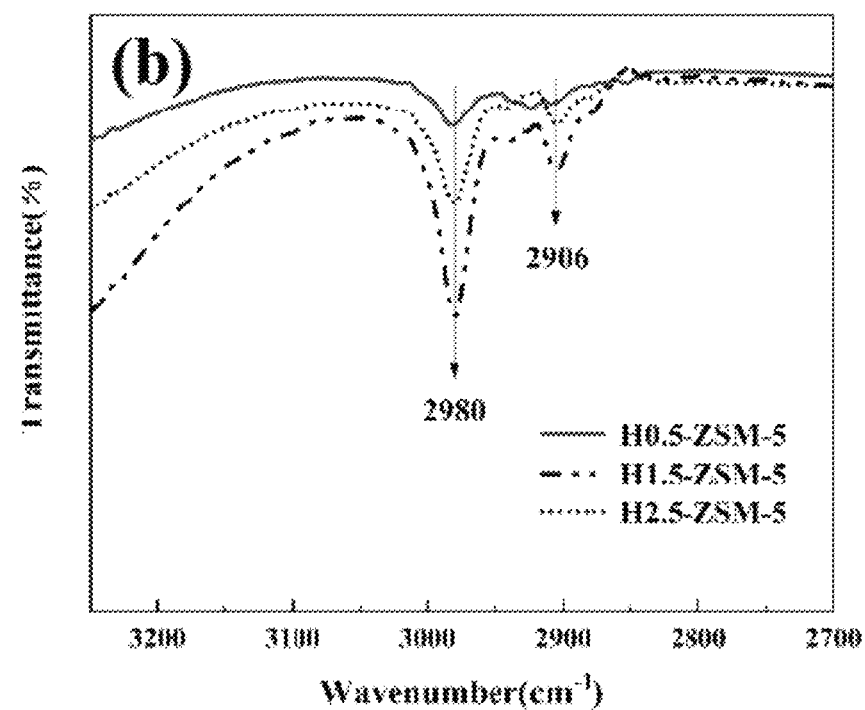

As shown in FIG. 5A, the organic-inorganic hierarchical ZSM-5 prepared in Examples 2-4 showed vibration absorption peaks of Si—O—Si bond near the wave number regions of 1222 cm$^{-1}$, 1094 cm$^{-1}$, 799 cm$^{-1}$, and 450 cm$^{-1}$ and stretching vibration and angular deformation vibration absorption peaks of Si—OH bond at 1640 cm$^{-1}$, and had standard peak positions of ZSM-5 at about 1222 cm$^{-1}$ and 550 cm$^{-1}$, wherein the position of 550 cm$^{-1}$ was a five-membered ring vibration absorption peak in the ZSM-5 skeleton. As shown in FIG. 5B, taking the wave number range of 3200 cm$^{-1}$ to 2700 cm$^{-1}$, it could be clearly observed that obvious peaks appeared at the positions of 2980 cm$^{-1}$ and 2906 cm$^{-1}$ and were saturated C—H stretching vibration absorption peaks, which could prove the successful introduction of —CH$_3$ and —CH$_2$—. In addition, as could be seen in FIG. 5B, the organic-inorganic hierarchical ZSM-5 prepared in Example 3 (H1.5-ZSM-5) had the strongest peak, that is, the introduction of —CH$_3$ was the most successful.

Figure 6A:
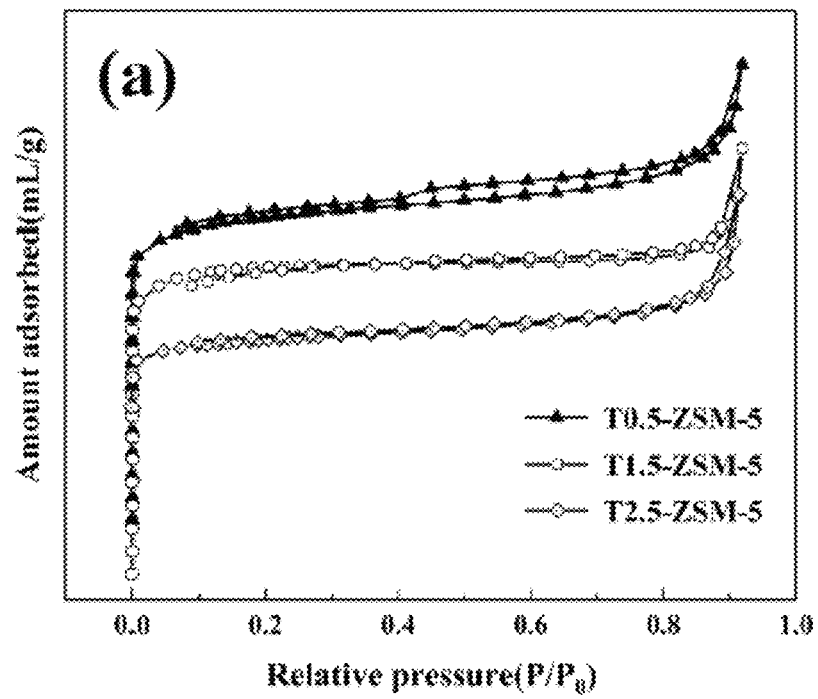
FIG. 6A is a nitrogen physical adsorption-desorption curve and FIG. 6B is a pore diameter distribution diagram of the organic-inorganic hierarchical ZSM-5 prepared in Examples 5-7.
Figure 6B:
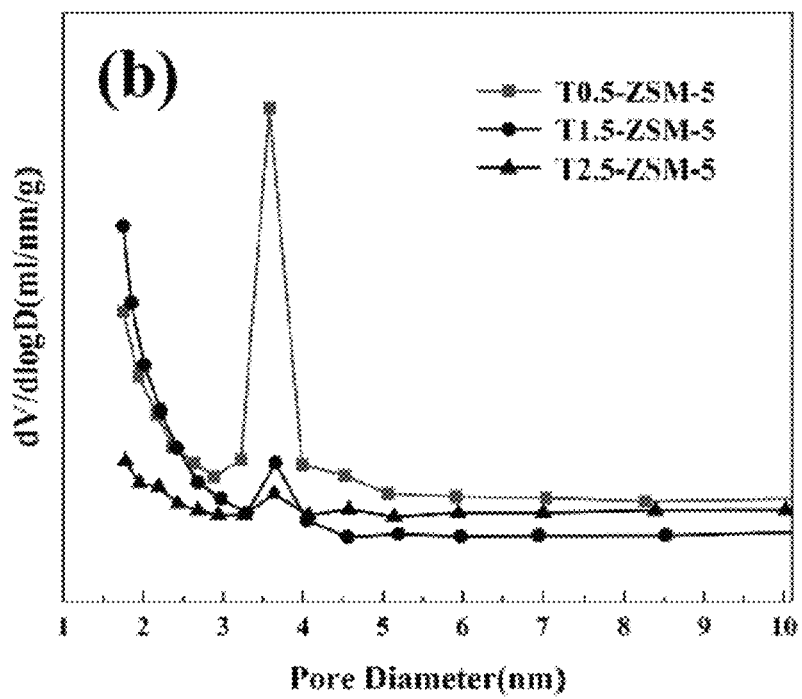

As shown in FIG. 6A, the nitrogen physical adsorption-desorption curves of the organic-inorganic hierarchical ZSM-5 prepared in Examples 5-7 were still typical type-I curves, and T0.5-ZSM-5 had a large number of obvious mesoporous structures, which could be seen from the hysteresis loop on the nitrogen physical adsorption-desorption curve. The H4-type hysteresis loop was obvious, indicating that T0.5-ZSM-5 was still a microporous-mesoporous structure, and the pore diameter distribution of mesopores in T0.5-ZSM-5 was uniform. As shown in FIG. 6B, in the BJH pore diameter distribution diagram, T0.5-ZSM-5 had an extremely abundant amount of mesopores, and with the increase of the organosilane, the amount of mesopores decreased significantly.

Figure 7A:
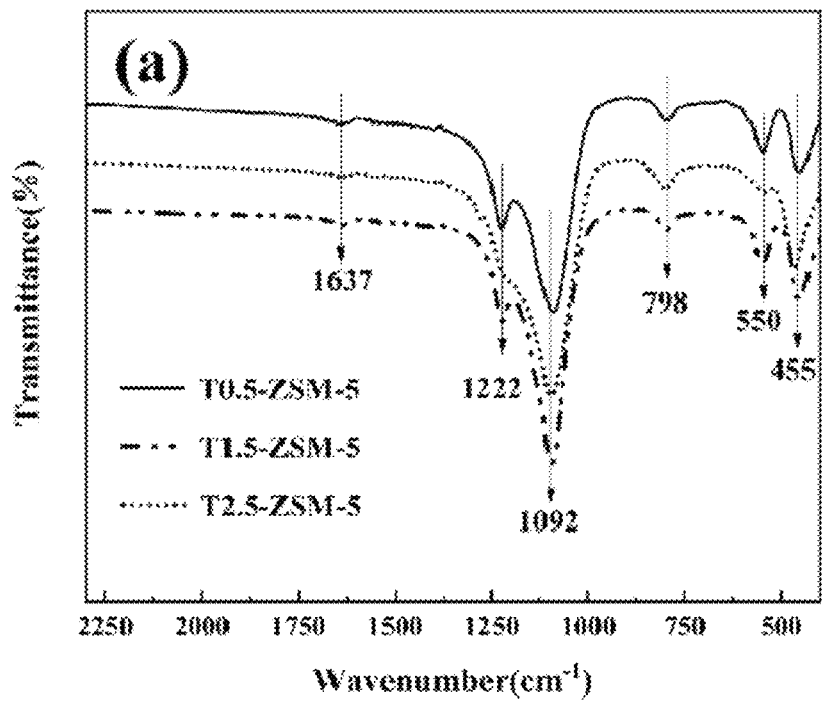
FIG. 7A is an infrared spectrum and FIG. 7B is an infrared spectrum of the organic-inorganic hierarchical ZSM-5 prepared in Examples 5-7.
Figure 7B:
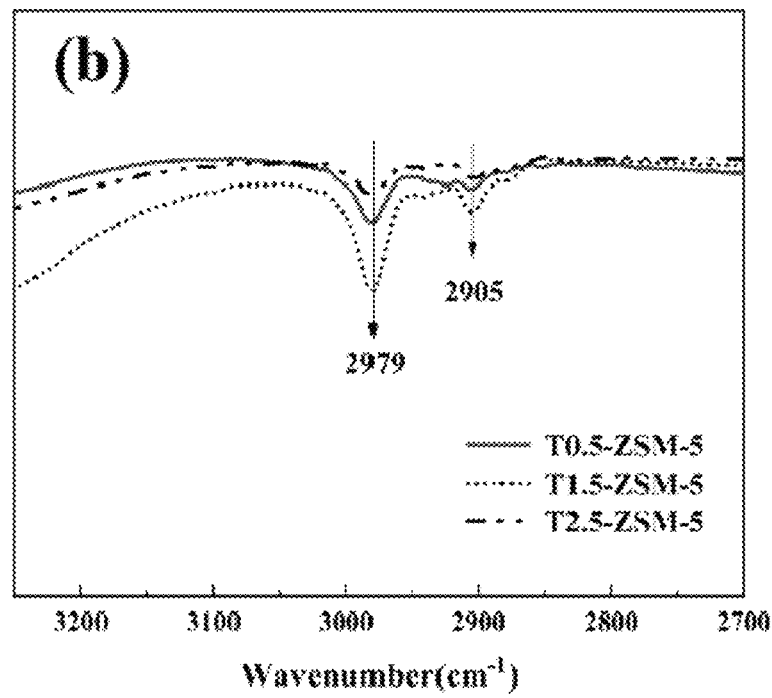

As shown in FIGS. 7A-7B, the organic-inorganic hierarchical ZSM-5 prepared in Examples 5-7 had obvious peaks near the wave number regions of 1094 cm$^{-1}$, 799 cm$^{-1}$, and 450 cm$^{-1}$; in addition, the characteristic peaks of the unique five-membered ring structure in the skeleton of ZSM-5 molecular sieve also appeared correspondingly at 550 cm$^{-1}$ and 1222 cm$^{-1}$; moreover, asymmetric stretching vibration peaks of —CH$_3$ appeared at 2980 cm$^{-1}$ and 2905 cm$^{-1}$, indicating that the hydrophobic group methyl was successfully introduced in the organic-inorganic hierarchical ZSM-5 prepared in Examples 5-7.

Figure 18:
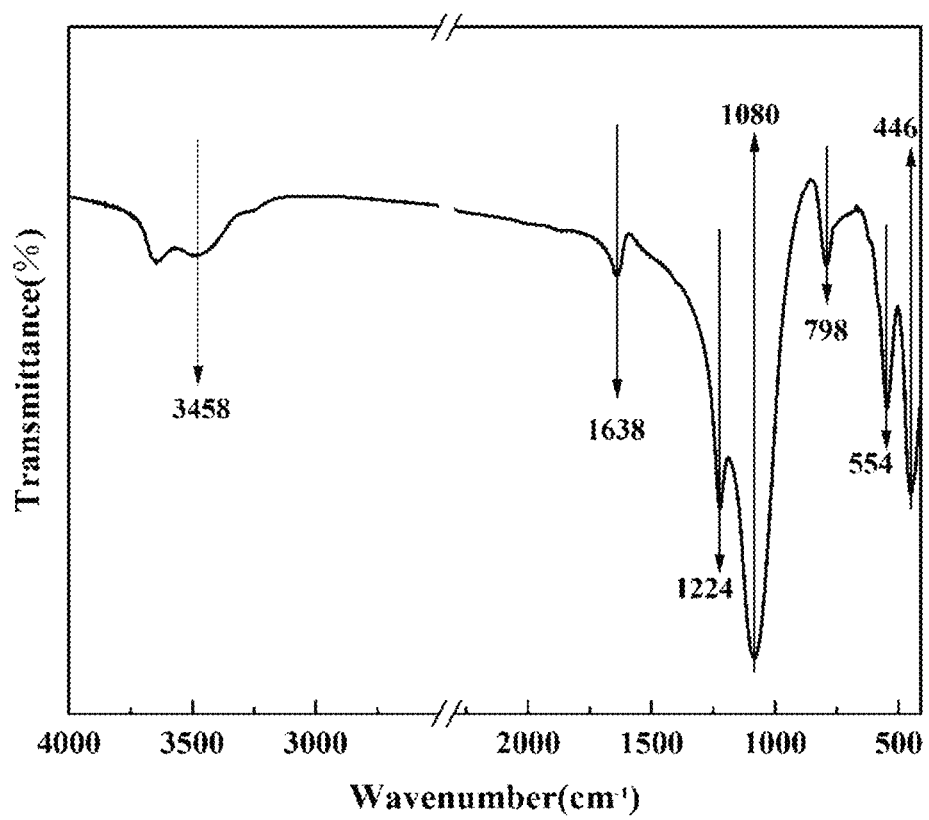
FIG. 18 is an infrared spectrum of the hierarchical ZSM-5 prepared in Example 1.

As shown in FIG. 18, in the infrared spectrum of the hierarchical ZSM-5 prepared in Example 1, a stretching vibration peak of Si—O—H appeared near 3458 cm$^{-1}$, and an angular deformation vibration absorption peak of Si—O—H appeared near the wave number of 1638 cm$^{-1}$. Vibration absorption peaks appeared near all the wave number regions of 1224 cm$^{-1}$, 1080 cm$^{-1}$, 798 cm$^{-1}$, and 446 cm$^{-1}$, wherein the two positions of 1224 cm$^{-1}$ and 554 cm$^{-1}$ were standard peak positions of ZSM-5, and a five-membered ring vibration absorption peak in the ZSM-5 skeleton appeared near the wave number of 554 cm$^{-1}$. In addition, no vibration absorption peak of methyl appeared in the range of 2800-3000 cm$^{-1}$. The composition of the hierarchical ZSM-5 prepared in Example 1 was a single inorganic component, and compared with the organic-inorganic hierarchical ZSM-5 prepared in Examples 2-7 (in which an organosilane was added), the structure thereof did not contain organic components.

Example 8

Low-concentration toluene adsorption test of the hierarchical ZSM-5 prepared in Example 1 under dry condition: 0.15 g of the hierarchical ZSM-5 prepared in Example 1 was weighed and subjected to a toluene adsorption test under dry condition, and the outlet toluene concentration was recorded every three minutes, wherein the inlet toluene concentration was maintained at 1800 mg/m$^3$ during the test, and the point at which the outlet toluene concentration reached 10% (volume percentage) of the inlet toluene concentration was defined as the breakthrough point.

Figure 8:
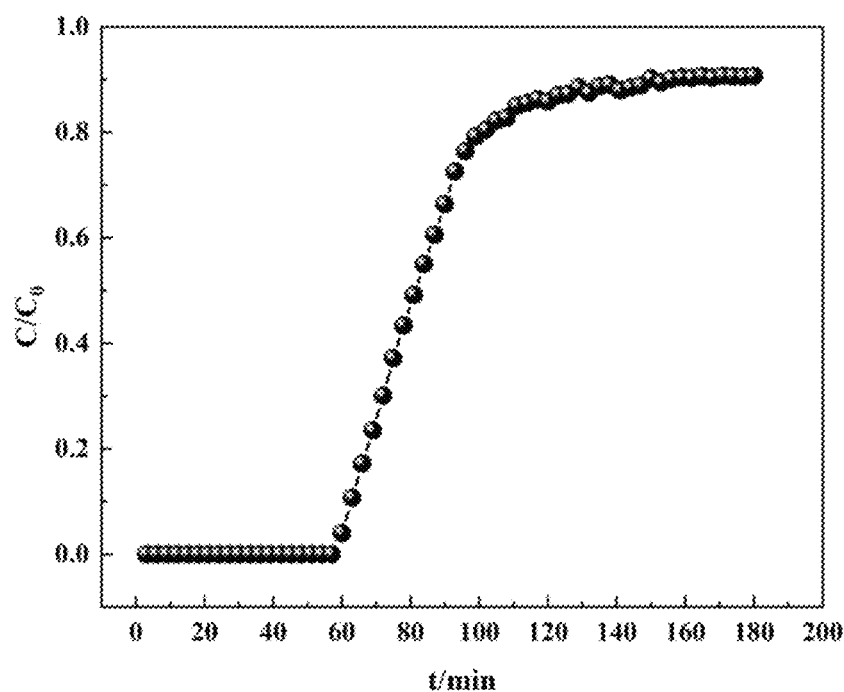
FIG. 8 is a low-concentration toluene adsorption breakthrough curve of the hierarchical ZSM-5 prepared in Example 1 under dry condition.

As shown in FIG. 8, the test results indicated that the hierarchical ZSM-5 prepared in Example 1 exhibited excellent adsorption performance on the premise of ensuring the integrity of its skeleton pores. Due to the action of a large number of mesopores, the internal pores of the hierarchical ZSM-5 were enhanced in communication to some extent, and this could directly enhance the internal diffusion efficiency of toluene molecules in the hierarchical ZSM-5. The presence of mesopores could open some unused micropores hidden inside, so they provided more adsorption sites for toluene adsorption on the basis of the original single micropore structure, which showed the importance of pore connectivity.

Figure 9:
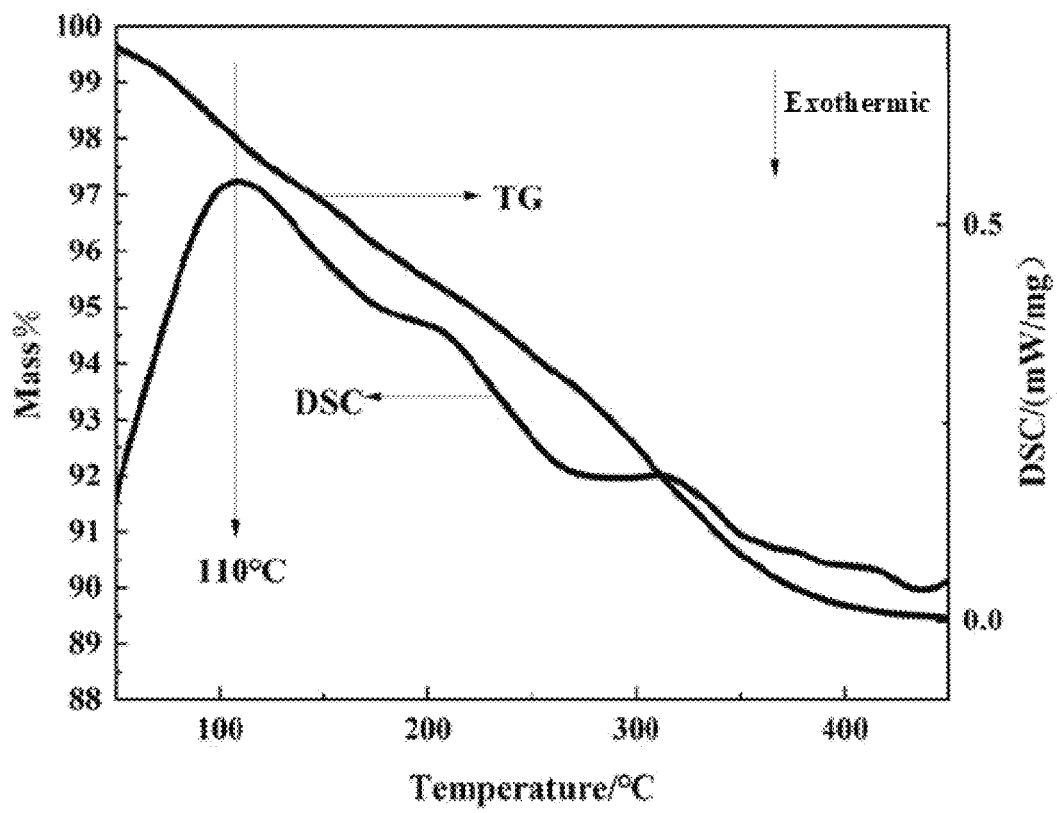
FIG. 9 is a TG curve and a DSC curve of the hierarchical ZSM-5 prepared in Example 1 under dry condition during desorption after saturated adsorption of low-concentration toluene.

Desorption test of the above-mentioned hierarchical ZSM-5 saturated with low-concentration toluene adsorption: STA 449F3-QMS 402D-IS50 thermal analyzer from Germany Nech Company was used during the desorption process to observe its desorption state. Specifically, the temperature programming was set to be raising from 30° C. to 500° C. As shown in FIG. 9, during the process in which the hierarchical ZSM-5 was heated from 30° C. to 500° C., the mass loss was consistent with its equilibrium adsorption amount of toluene. In addition, the DSC curve also showed that it had an obvious endothermic effect, which could thus verify that this process was a process in which the toluene molecules adsorbed by the hierarchical ZSM-5 were desorbed during the heating process. The desorption peak in the DSC curve of this sample reached the maximum at 110° C., and the desorption could be completed at 400° C.

Example 9

The hierarchical ZSM-5 prepared in Example 1 was subjected to a high-concentration toluene adsorption test under dry condition. The test method was basically the same as that in Example 8, only except that the inlet toluene concentration maintained at "1800 mg/m$^3$" was changed to "4000 mg/m$^3$".

The above-mentioned hierarchical ZSM-5 saturated in high-concentration toluene adsorption was subjected to a desorption test, and the test method was the same as the desorption test in Example 8.

Figure 10:
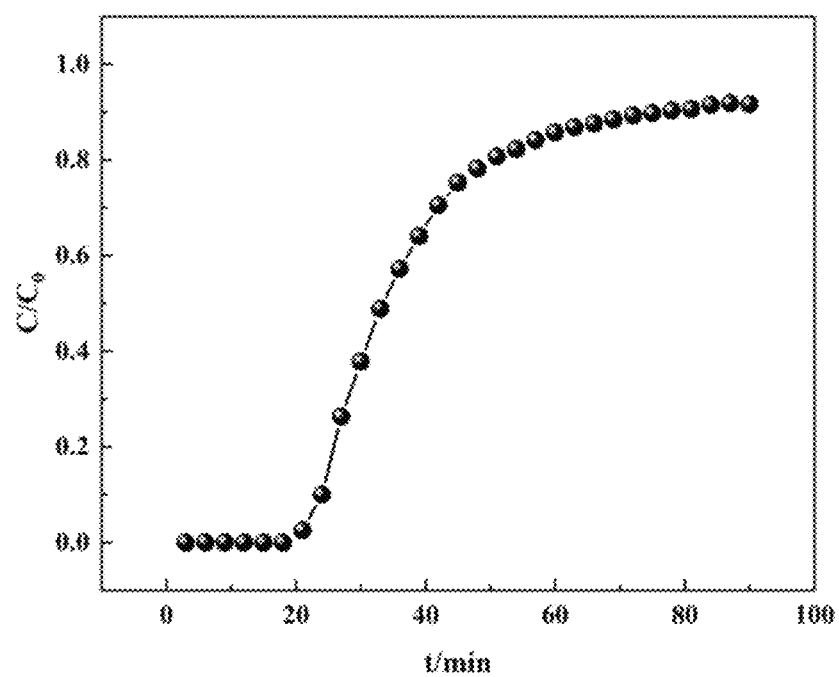
FIG. 10 is a high-concentration toluene adsorption breakthrough curve of the hierarchical ZSM-5 prepared in Example 1 under dry condition.

As shown in FIG. 10, after the inlet toluene concentration was significantly increased, the hierarchical ZSM-5 prepared in Example 1 still exhibited excellent toluene adsorption.

Figure 11:
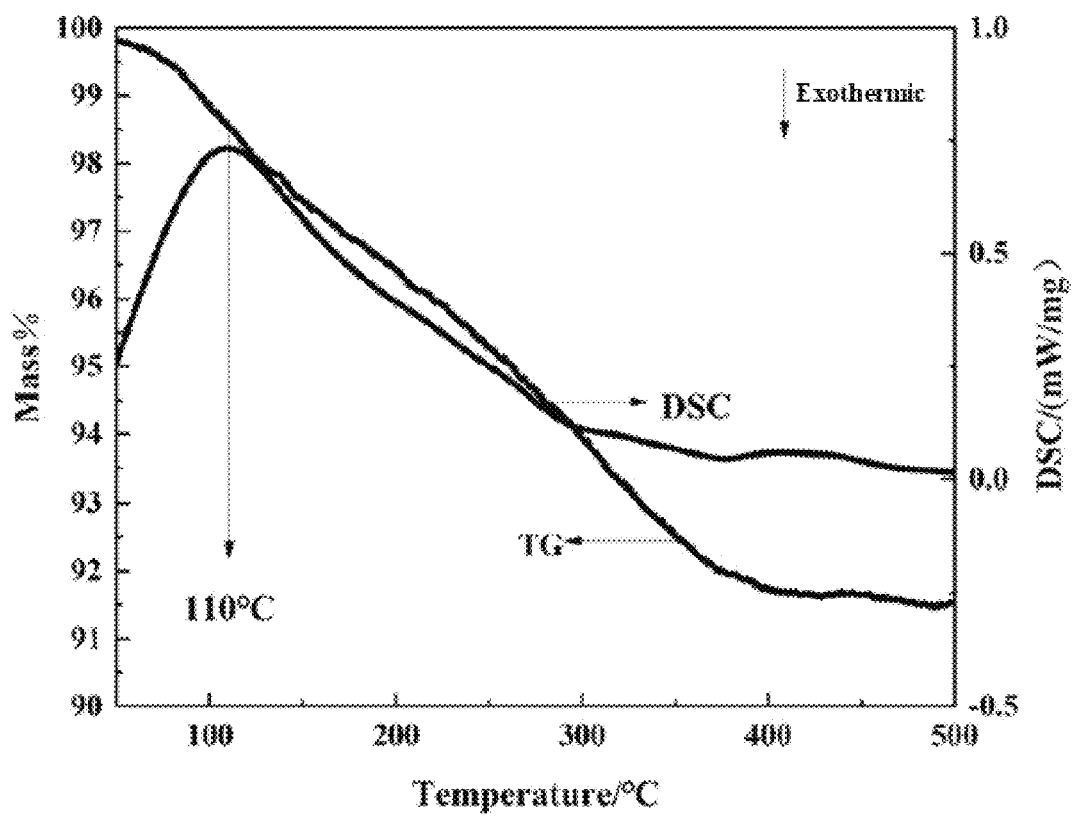
FIG. 11 is a TG curve and a DSC curve of the hierarchical ZSM-5 prepared in Example 1 under dry condition during desorption after saturated adsorption of high-concentration toluene.

The above-mentioned hierarchical ZSM-5 saturated in high-concentration toluene adsorption was subjected to a desorption test. The results in FIG. 11 showed that the desorption of high-concentration toluene was consistent with the low-concentration toluene desorption results, indicating that the hierarchical ZSM-5 prepared in Example 1 maintained stable adsorption performance at different concentrations.

Example 10

The organic-inorganic hierarchical ZSM-5 (H1.5-ZSM-5) prepared in Example 3 and the organic-inorganic hierarchical ZSM-5 (T1.5-ZSM-5) prepared in Example 6 were separately subjected to a low-concentration toluene adsorption test under dry condition. 0.15 g of the organic-inorganic hierarchical ZSM-5 was weighed and subjected to a toluene adsorption test under dry condition, and the outlet toluene concentration was recorded every three minutes, wherein the inlet toluene concentration was maintained at 1800 mg/m$^3$ during the test, and the point at which the outlet toluene concentration reached 10% of the inlet toluene concentration was defined as the breakthrough point.

Figure 12A:
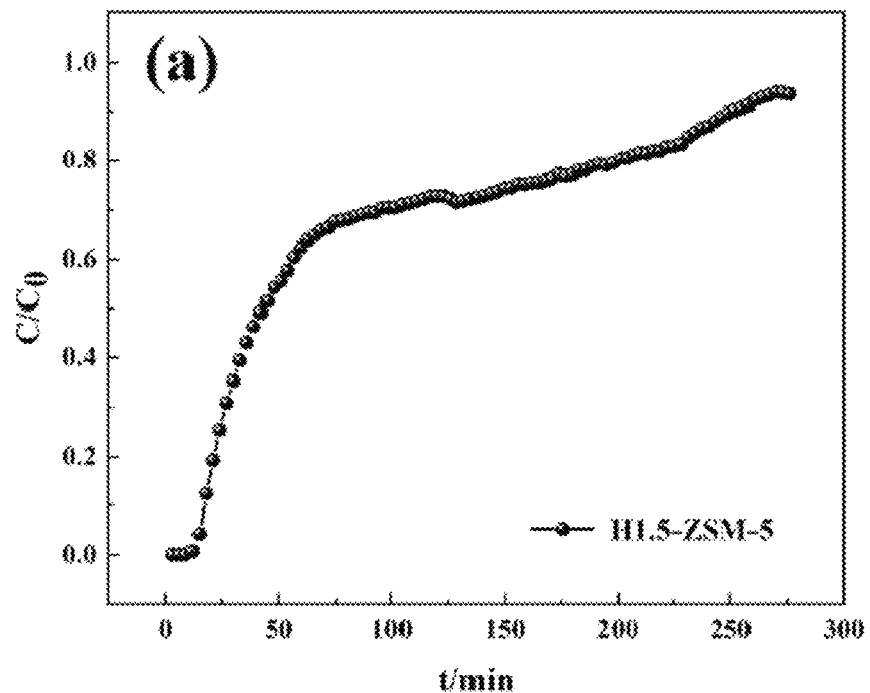
FIG. 12A is a low-concentration toluene adsorption breakthrough curve of the organic-inorganic hierarchical ZSM-5 prepared in Example 3 and FIG. 12B is a low-concentration toluene adsorption breakthrough curve of the organic-inorganic hierarchical ZSM-5 prepared in Example 6 under dry condition.
Figure 12B:
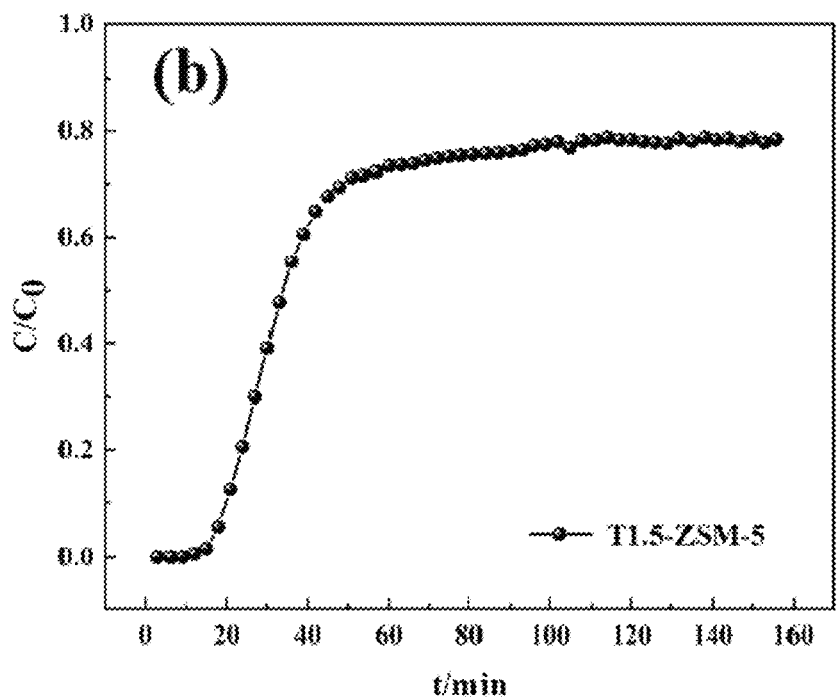
Figure 13A:
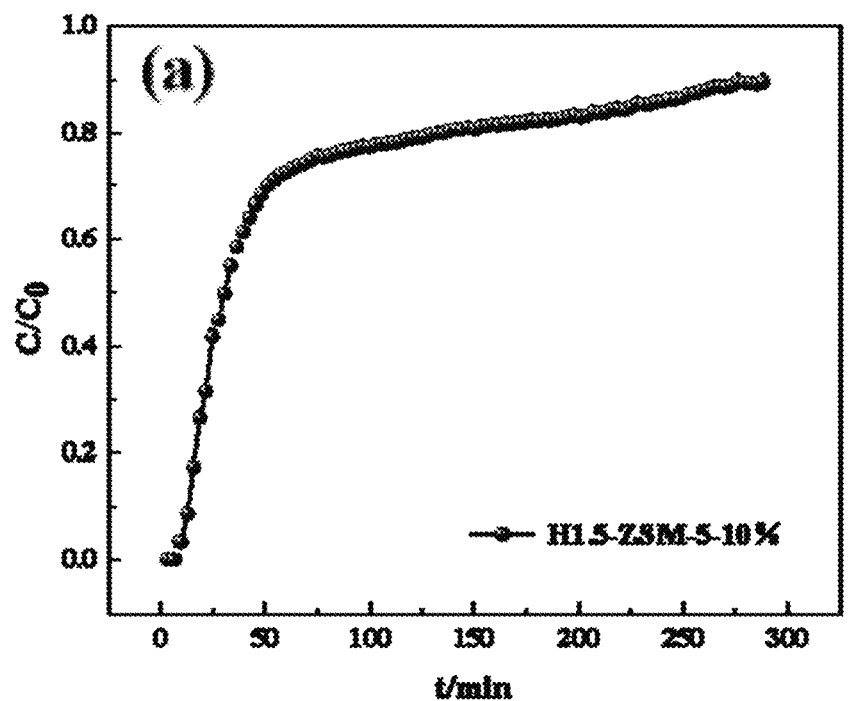
FIG. 13A is a low-concentration toluene adsorption breakthrough curve of the organic-inorganic hierarchical ZSM-5 prepared in Example 3 under a relative humidity of 10%.
Figure 13B:
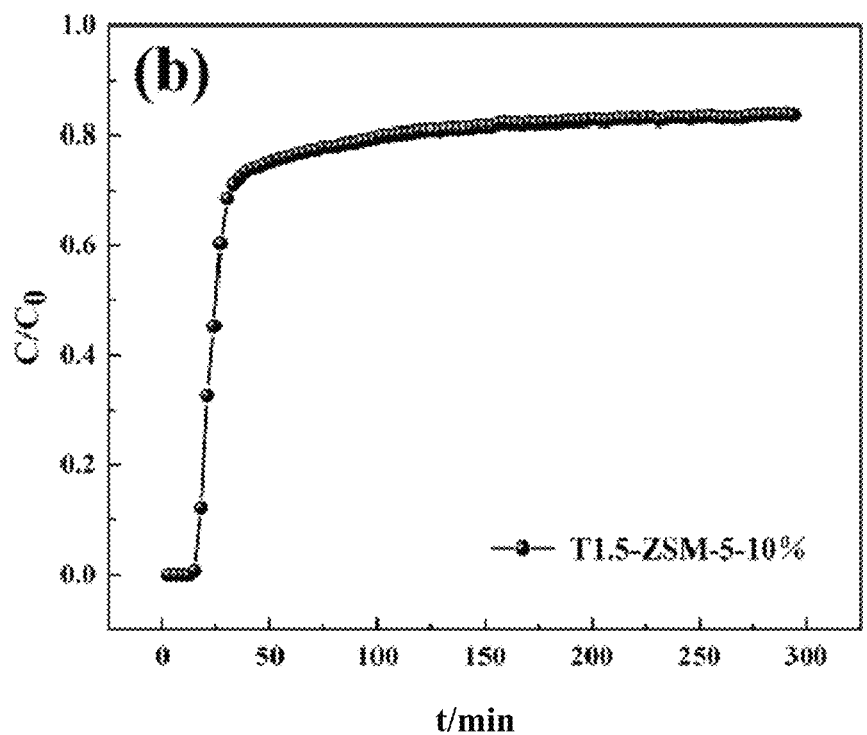
FIG. 13B is a low-concentration toluene adsorption breakthrough curve of the organic-inorganic hierarchical ZSM-5 prepared in Example 6 under a relative humidity of 10%.
Figure 13C:
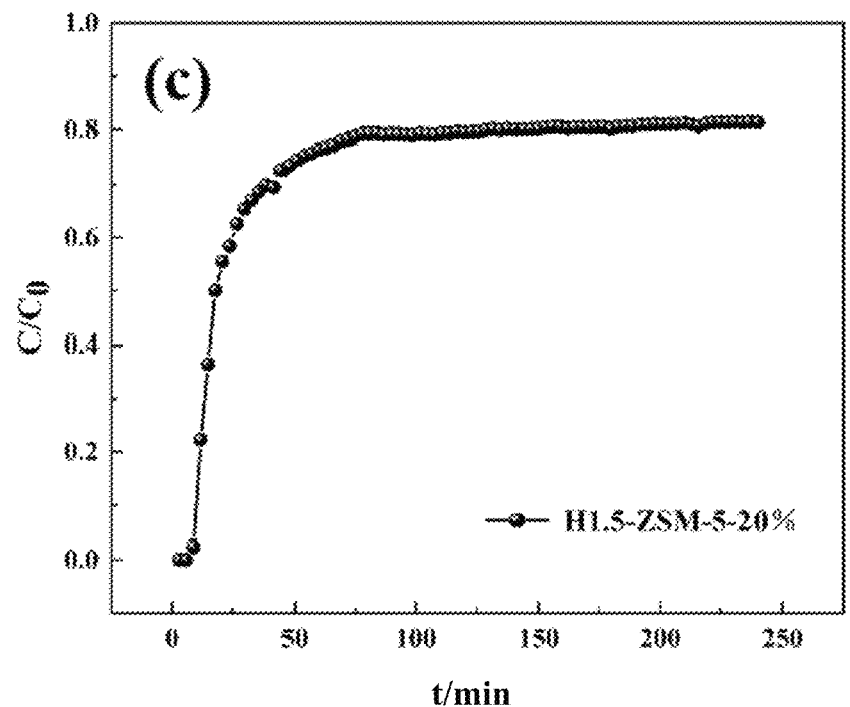
FIG. 13C is a low-concentration toluene adsorption breakthrough curve of the organic-inorganic hierarchical ZSM-5 prepared in Example 3 under a relative humidity of 20%.
Figure 13D:
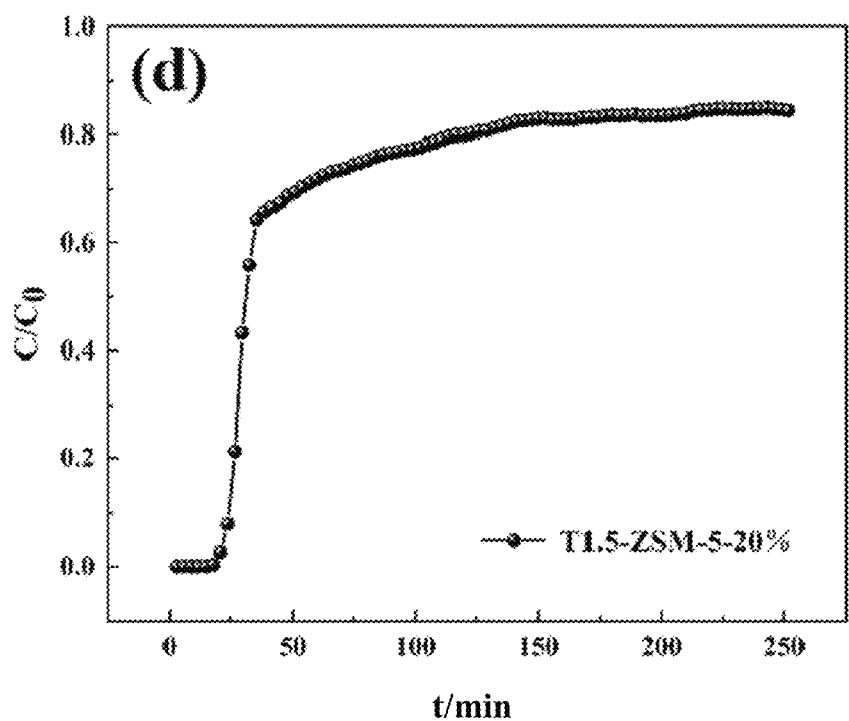
FIG. 13D is a low-concentration toluene adsorption breakthrough curve of the organic-inorganic hierarchical ZSM-5 prepared in Example 6 under a relative humidity of 20%.
Figure 13E:
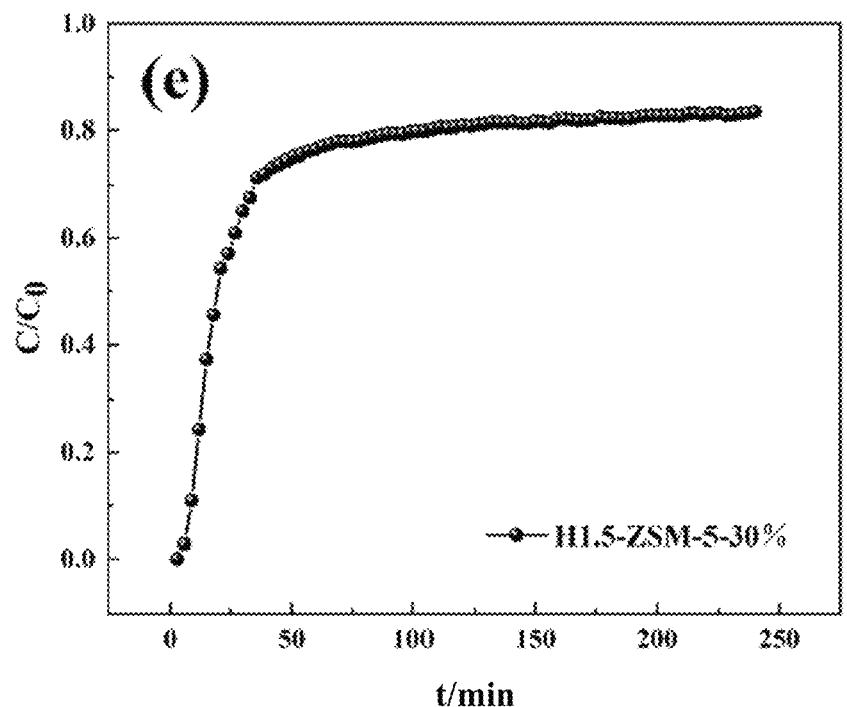
FIG. 13E is a low-concentration toluene adsorption breakthrough curve of the organic-inorganic hierarchical ZSM-5 prepared in Example 3 under a relative humidity of 30%.
Figure 13F:
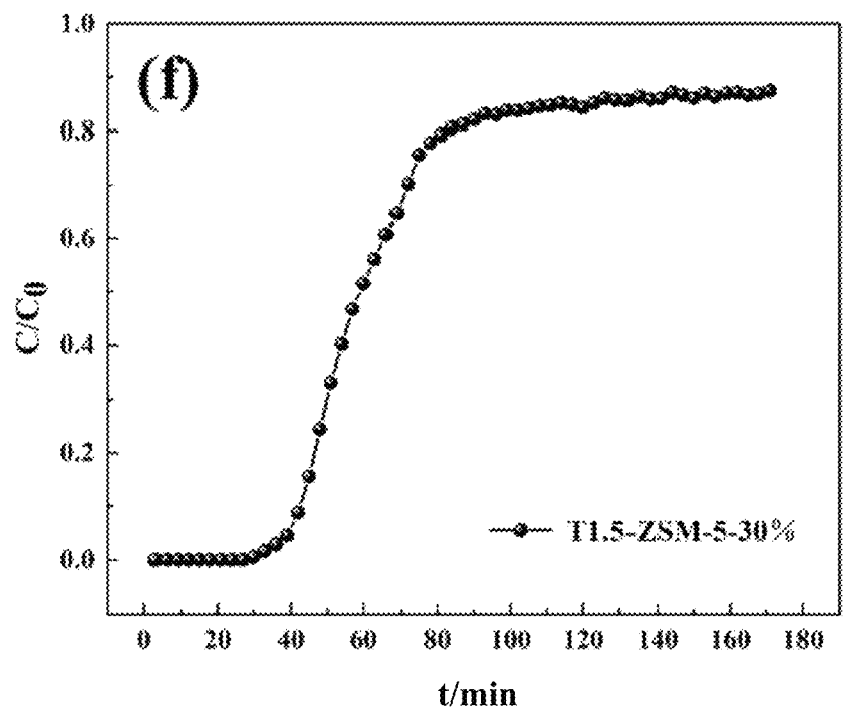
FIG. 13F is a low-concentration toluene adsorption breakthrough curve of the organic-inorganic hierarchical ZSM-5 prepared in Example 6 under a relative humidity of 30%.

As shown in FIGS. 12A-12B, compared with the existing post-treatment methods, etc., the organic-inorganic hierarchical ZSM-5 did not destroy the original skeleton pore structure of the hierarchical ZSM-5. Table 1 was the equilibrium adsorption amounts of low-concentration toluene by the hierarchical ZSM-5, T1.5-ZSM-5, and H1.5-ZSM-5 prepared in Example 1 under dry condition. It could be seen that the hierarchical ZSM-5 and the organic-inorganic hierarchical ZSM-5 both had excellent toluene adsorption capacity under dry condition.

TABLE 1

| | Example | | |
| --- | --- | --- | --- |
| | Example 1 | Example 3 (H1.5-ZSM-5) | Example 6 (T1.5-ZSM-5) |
| Equilibrium adsorption amount (mg/g) | 116 | 110 | 109 |

Example 11

The organic-inorganic hierarchical ZSM-5 (H1.5-ZSM-5) prepared in Example 3 and the organic-inorganic hierarchical ZSM-5 (T1.5-ZSM-5) prepared in Example 6 was subjected to a low-concentration toluene adsorption test under humidified condition, and the test method was basically the same as that in Example 10, only except that the "dry condition" was replaced with "humidified condition", and the humidified condition was set to have a relative humidity of 10%, 20%, or 30%.

As shown in FIGS. 13A-13F, in this example, H1.5-ZSM-5-10% was a low-concentration toluene adsorption breakthrough curve of H1.5-ZSM-5 under a relative humidity of 10%, T1.5-ZSM-5-10% was a low-concentration toluene adsorption breakthrough curve of T1.5-ZSM-5 under a relative humidity of 10%, H1.5-ZSM-5-20% was a low-concentration toluene adsorption breakthrough curve of H1.5-ZSM-5 under a relative humidity of 20%, T1.5-ZSM-5-20% was a low-concentration toluene adsorption breakthrough curve of T1.5-ZSM-5 under a relative humidity of 20%, H1.5-ZSM-5-30% was a low-concentration toluene adsorption breakthrough curve of H1.5-ZSM-5 under a relative humidity of 30%, and T1.5-ZSM-5-30% was a low-concentration toluene adsorption breakthrough curve of T1.5-ZSM-5 under a relative humidity of 30%. It could be seen that when water molecules participated in adsorption competition, the hydrophobic group methyl introduced into the organic-inorganic hierarchical ZSM-5 began to function. In the relative humidity range of 10-30%, the organic-inorganic hierarchical ZSM-5 maintained stable toluene adsorption capacity. In a related literature (X. Liu, et al. Science of the Total Environment, 2023, 894: 164919), the ZSM-5 molecular sieve was very sensitive to water during the process of adsorbing VOCs, so when water was contained during the adsorption process, the molecular sieve basically lost its adsorption capacity, and the pore channel structure was blocked by water molecules. In addition, compared with the hierarchical ZSM-5 prepared in Example 1, H1.5-ZSM-5 and T1.5-ZSM-5 had obvious water resistance within the relative humidity range of 10-30%. The equilibrium adsorption capacities of low-concentration toluene H1.5-ZSM-5 and T1.5-ZSM-5 under different humidity conditions were as shown in Table 2.

TABLE 2

| | Relative humidity | | |
|---|---|---|---|
| | 10% | 20% | 30% |
| Example 1 (ZSM-5) equilibrium adsorption amount (mg/g) | 87 | 69 | 41 |
| Example 3 (H1.5-ZSM-5) equilibrium adsorption amount (mg/g) | 111 | 98 | 89 |
| Example 6 (T1.5-ZSM-5) equilibrium adsorption amount (mg/g) | 101 | 94 | 88 |

Example 12

The organic-inorganic hierarchical ZSM-5 (H1.5-ZSM-5) prepared in Example 3 and the organic-inorganic hierarchical ZSM-5 (T1.5-ZSM-5) prepared in Example 6 were subjected to a high-concentration toluene adsorption test under dry condition, and the test method was basically the same as that in Example 10, only except that the "dry condition" was replaced with "humidified condition", the inlet toluene concentration maintained at "1800 mg/m$^3$" was changed to "4000 mg/m$^3$".

Figure 14A:
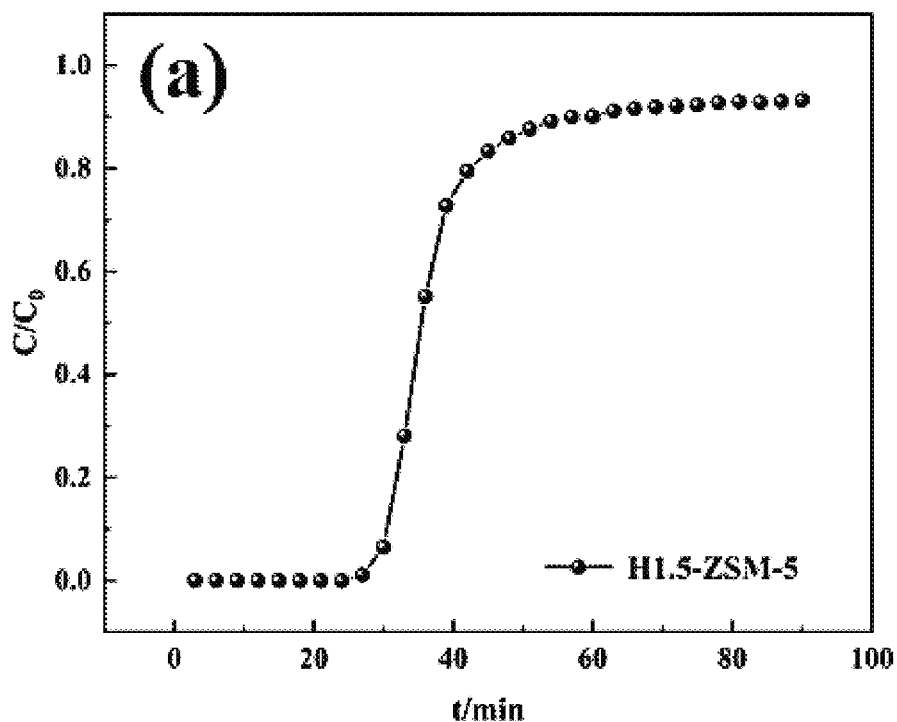
FIG. 14A is a high-concentration toluene adsorption breakthrough curve of the organic-inorganic hierarchical ZSM-5 prepared in Example 3 and FIG. 14B is a high-concentration toluene adsorption breakthrough curve of the organic-inorganic hierarchical ZSM-5 prepared in Example 6 under dry condition.
Figure 14B:
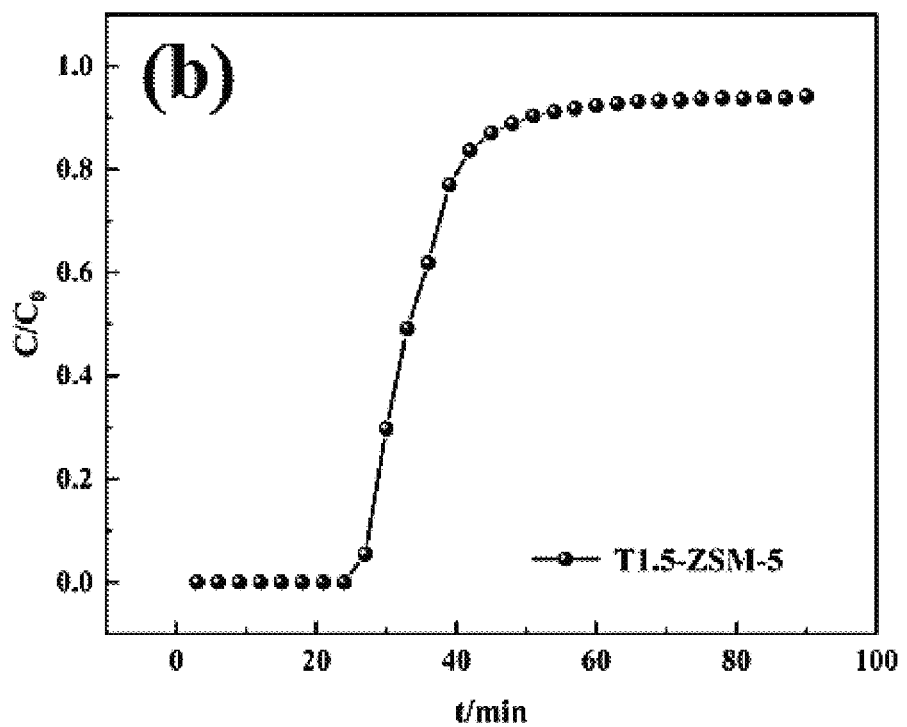
Figure 15A:
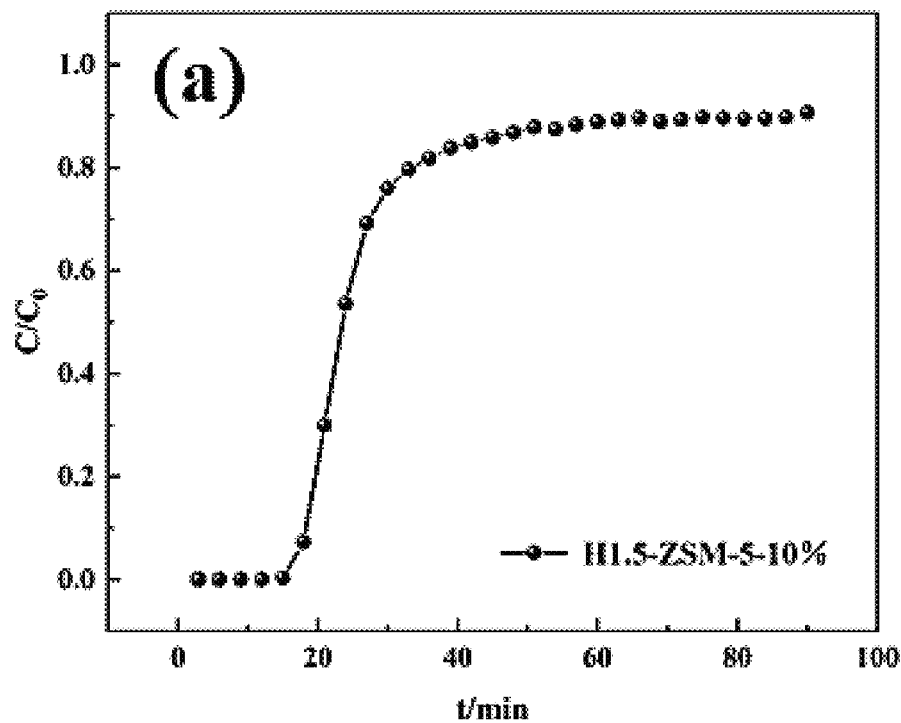
FIGS. 15A-15C are a high-concentration toluene adsorption breakthrough curve of the organic-inorganic hierarchical ZSM-5 prepared in Example 3 under a relative humidity of 10%, 20% and 30%.
Figure 15B:
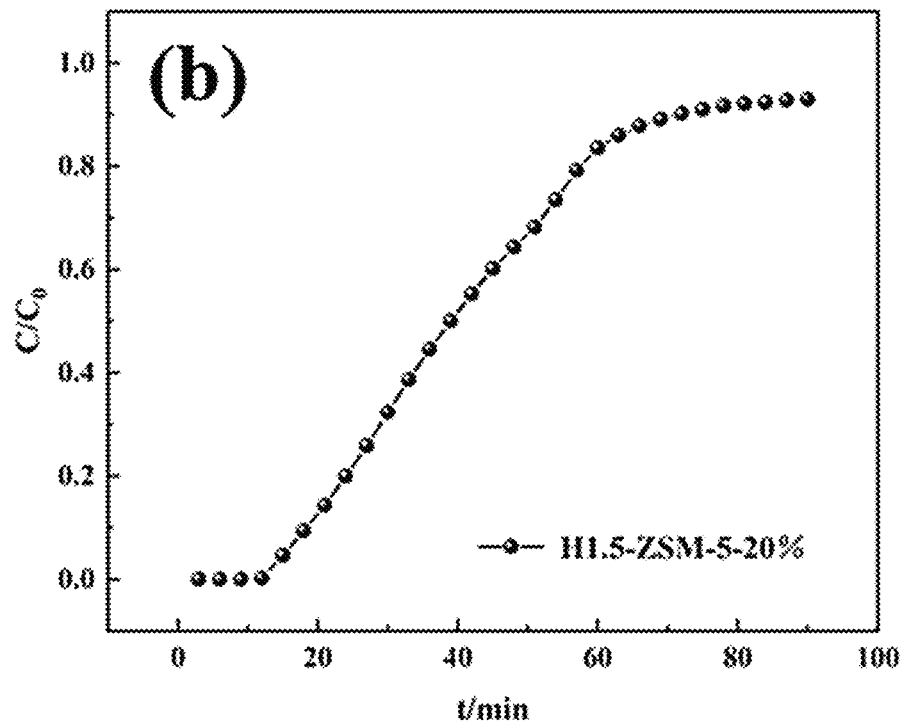
Figure 15C:
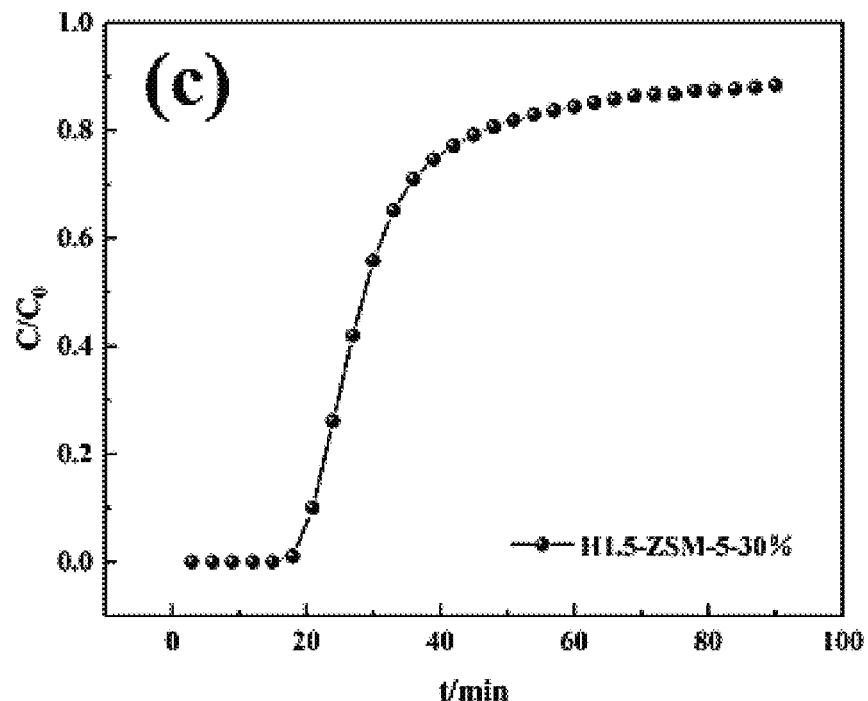
Figure 15D:
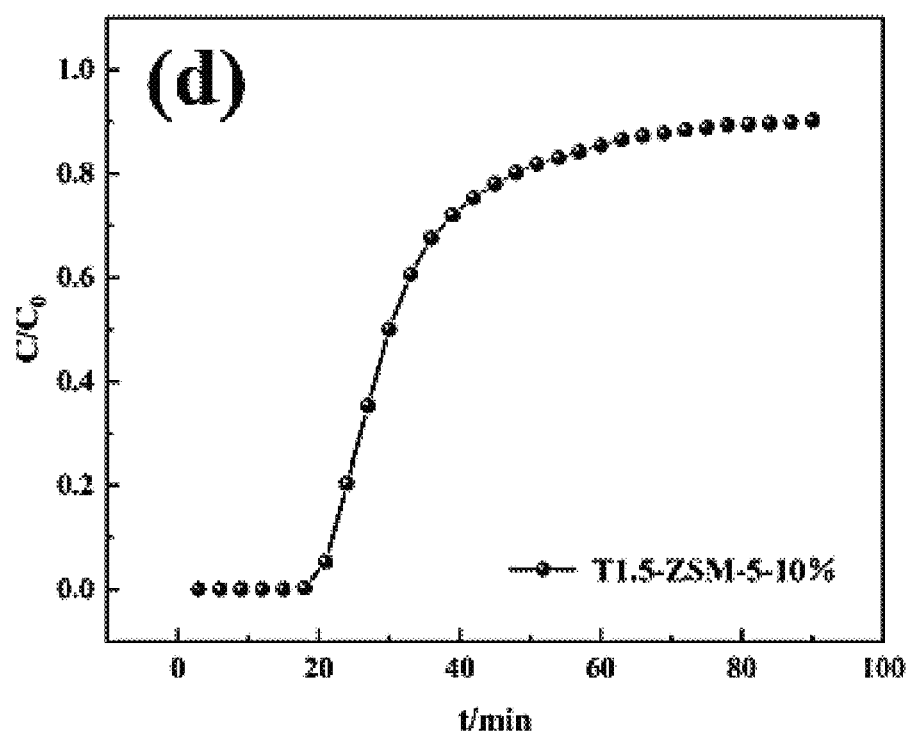
FIGS. 15D-15F are a high-concentration toluene adsorption breakthrough curve of the organic-inorganic hierarchical ZSM-5 prepared in Example 6 under a relative humidity of 10%, 20% and 30%.
Figure 15E:
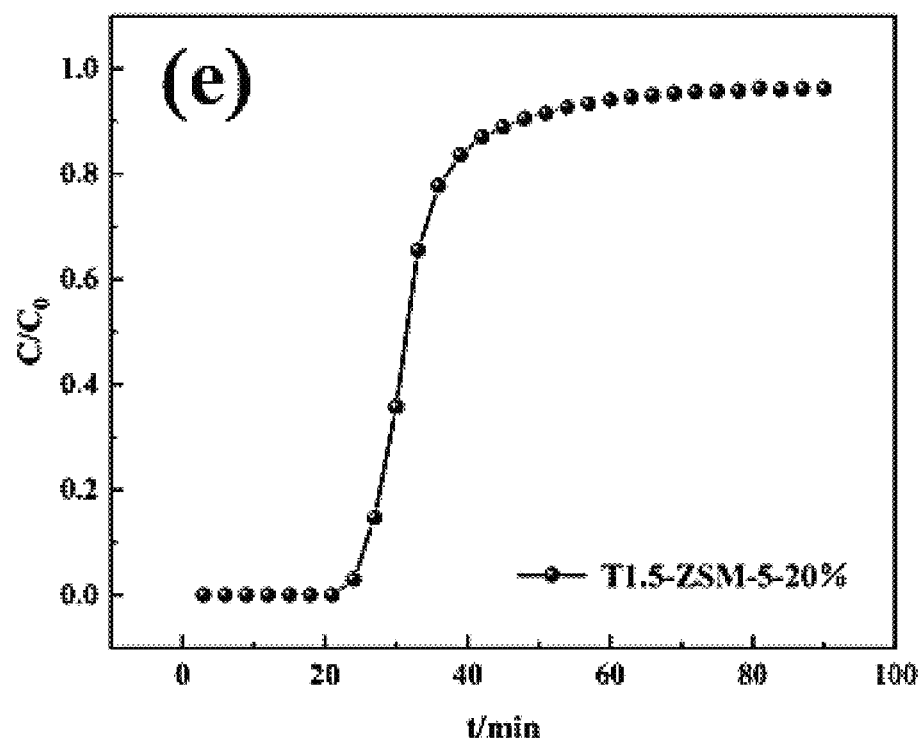
Figure 15F:
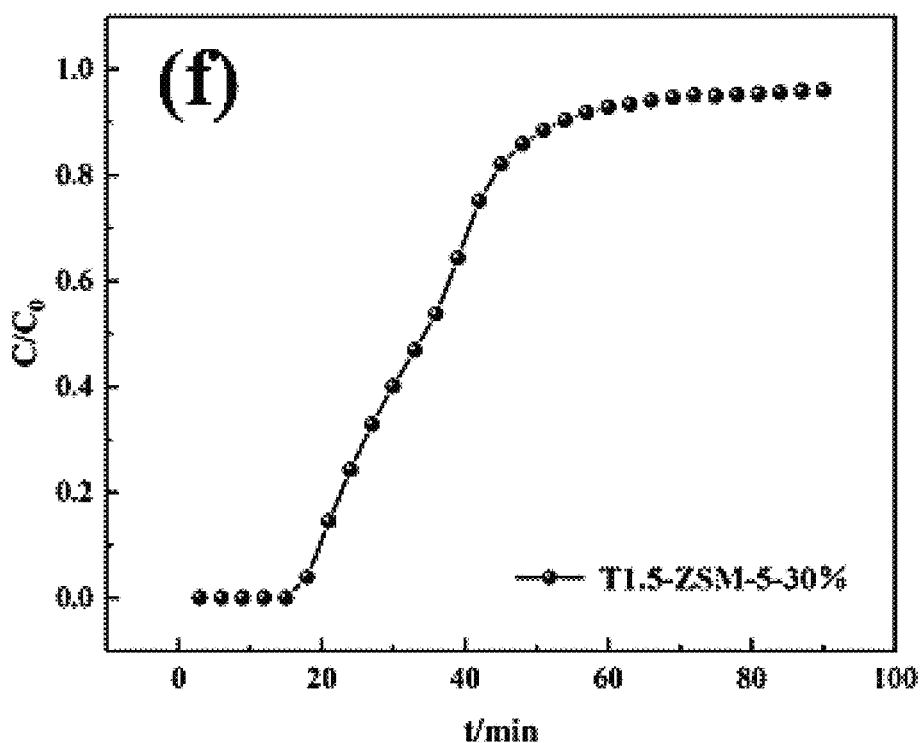

As shown in FIGS. 14A-14B, in this example, the adsorption performance of H1.5-ZSM-5 and T1.5-ZSM-5 did not decrease as the concentration of the adsorbate (toluene) increased. Through the adsorption experiment of this example, it could be determined that 0.15 g of H1.5-ZSM-5 reached saturated adsorption for 4000 mg/m$^3$ of toluene within 120 minutes, and 0.15 g of T1.5-ZSM-5 also reached saturated adsorption for 4000 mg/m$^3$ of toluene within 120 minutes. Table 3 was the equilibrium adsorption capacities of H1.5-ZSM-5 and T1.5-ZSM-5 for high-concentration toluene under dry condition. Through the calculation of the equilibrium adsorption amount, it could be concluded that with regard to toluene discharge at 4000 mg/m$^3$, H1.5-ZSM-5 and T1.5-ZSM-5 still exhibited stable and excellent adsorption.

TABLE 3

| | Example | |
|---|---|---|
| | Example 3 (H1.5-ZSM-5) | Example 6 (T1.5-ZSM-5) |
| Equilibrium adsorption amount (mg/g) | 106 | 103 |

Example 13

The organic-inorganic hierarchical ZSM-5 (H1.5-ZSM-5) prepared in Example 3 and the organic-inorganic hierarchical ZSM-5 (T1.5-ZSM-5) prepared in Example 6 were subjected to a high-concentration toluene adsorption test under humidified condition, and the test method was basically the same as that in Example 12, only except that the "dry condition" was replaced with "humidified condition", and the humidified condition was set to have a relative humidity of 10%, 20%, or 30%.

As shown in FIGS. 15A-15F, the experimental results showed that H1.5-ZSM-5 and T1.5-ZSM-5 still had stable adsorption of toluene gas in a high-concentration low-humidity environment under 30% relative humidity, and within this humidity range, H1.5-ZSM-5 and T1.5-ZSM-5 maintained stable toluene adsorption. Table 4 was the equilibrium adsorption capacities of high-concentration toluene by H1.5-ZSM-5 and T1.5-ZSM-5 under different relative humidity conditions.

TABLE 4

| | Relative humidity | | |
|---|---|---|---|
| Equilibrium adsorption amount | 10% | 20% | 30% |
| Example 3 (H1.5-ZSM-5) equilibrium adsorption amount (mg/g) | 107 | 99 | 91 |
| Example 6 (T1.5-ZSM-5) equilibrium adsorption amount (mg/g) | 102 | 93 | 89 |

Example 14

On the premise that the organic-inorganic hierarchical ZSM-5 was determined to have a good toluene adsorption performance under different conditions, the organic-inorganic hierarchical ZSM-5 (H1.5-ZSM-5) prepared in Example 3 and the organic-inorganic hierarchical ZSM-5 (T1.5-ZSM-5) prepared in Example 6 were explored for the cyclic adsorption stability for low-concentration toluene (the inlet toluene concentration was 1800 mg/m$^3$) under dry condition, and the cyclic adsorption experiment was carried out by taking adsorption-desorption as a cycle. Specifically, 0.15 g of the organic-inorganic hierarchical ZSM-5 was weighed and subjected to a toluene adsorption test under dry condition. The organic-inorganic hierarchical ZSM-5 saturated in toluene adsorption was placed in a high-temperature oven at 300° C. for 2 hours of high-temperature desorption, and after successful recovery and desorption, the next cycle was tested. Three cycles were carried out in order (the mass loss was ignored in the experimental process). The experimental results showed that H1.5-ZSM-5 and T1.5-ZSM-5 maintained good cyclic stability during the process of discharging low-concentration toluene under dry condition. Table 5 was the data of the cyclic adsorption stability of H1.5-ZSM-5 and T1.5-ZSM-5 for low-concentration toluene under dry condition.

TABLE 5

| | Example | |
|---|---|---|
| | Example 3 (H1.5-ZSM-5) | Example 6 (T1.5-ZSM-5) |
| Cyclic adsorption stability | 92% | 91% |

Cyclic adsorption stability: the percentage of equilibrium adsorption amount after three cycles relative to the first equilibrium adsorption amount.

Example 15

This example was to explore the cyclic adsorption stability of the organic-inorganic hierarchical ZSM-5 (H1.5-ZSM-5) prepared in Example 3 and the organic-inorganic hierarchical ZSM-5 (T1.5-ZSM-5) prepared in Example 6 for high-concentration toluene under dry condition, and was basically the same as that in Example 14, only except that the inlet toluene concentration was changed from 1800 mg/m$^3$ to "4000 mg/m$^3$".

Table 6 was the data of the cyclic adsorption stability of H1.5-ZSM-5 and T1.5-ZSM-5 for high-concentration toluene under dry condition. The experimental results showed that as the inlet toluene concentration increased, H1.5-ZSM-5 and T1.5-ZSM-5 both maintained good cyclic adsorption stability within the range of 4000 mg/m$^3$, and after three cycles of adsorption experiments (the mass loss was neglected), the adsorption performance thereof remained 90% or higher.

TABLE 6

|  | Example | |
|---|---|---|
|  | Example 3 (H1.5-ZSM-5) | Example 6 (T1.5-ZSM-5) |
| Cyclic adsorption stability | 93% | 92% |

Example 16

This example was to explore the cyclic adsorption stability of the organic-inorganic hierarchical ZSM-5 (H1.5-ZSM-5) prepared in Example 3 and the organic-inorganic hierarchical ZSM-5 (T1.5-ZSM-5) prepared in Example 6 for low-concentration toluene (the inlet toluene concentration was 1800 mg/m$^3$) under humidified condition, and was basically the same as that in Example 14, only except that the "dry condition" was replaced by "humidified condition", and the relative humidity was set to 10%, 20%, or 30%.

Table 7 was the data of the cyclic adsorption stability of H1.5-ZSM-5 and T1.5-ZSM-5 for low-concentration toluene under different relative humidity conditions in this example. Through three cycles of cyclic adsorption experiments, it could be seen that H1.5-ZSM-5 and T1.5-ZSM-5 still had good cyclic adsorption stability in different humidity environments under low-concentration toluene discharge condition, and within the 30% relative humidity range, the cyclic stability of H1.5-ZSM-5 and T1.5-ZSM-5 for toluene adsorption was not disturbed by water vapor.

TABLE 7

|  | Example | |
|---|---|---|
|  | Example 3 (H1.5-ZSM-5) | Example 6 (T1.5-ZSM-5) |
| Cyclic adsorption stability | 91% | 92% |

Example 17

This example was to explore the cyclic adsorption stability of the organic-inorganic hierarchical ZSM-5 (H1.5-ZSM-5) prepared in Example 3 and the organic-inorganic hierarchical ZSM-5 (T1.5-ZSM-5) prepared in Example 6 for high-concentration toluene under humidified condition, and was basically the same as that in Example 16, only except that the inlet toluene concentration was changed from "1800 mg/m$^3$" to "4000 mg/m$^3$".

Table 8 was the data of the cyclic adsorption stability of H1.5-ZSM-5 and T1.5-ZSM-5 for high-concentration toluene under different relative humidity conditions in this example. It could be seen that within the relative humidity range (10-30%), H1.5-ZSM-5 and T1.5-ZSM-5 still maintained stable cyclic adsorption for high-concentration discharged toluene gas, and after three cycles of adsorption experiments, the adsorption amount still reached 90% or more of the equilibrium adsorption amount in the first adsorption test.

TABLE 8

|  | Example | |
|---|---|---|
|  | Example 3 (H1.5-ZSM-5) | Example 6 (T1.5-ZSM-5) |
| Cyclic adsorption stability | 92% | 92% |

Example 18

Figure 16A:
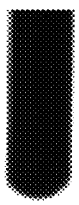
FIG. 16A is a static water contact angle of the hierarchical ZSM-5 prepared in Example 1.
Figure 16A:
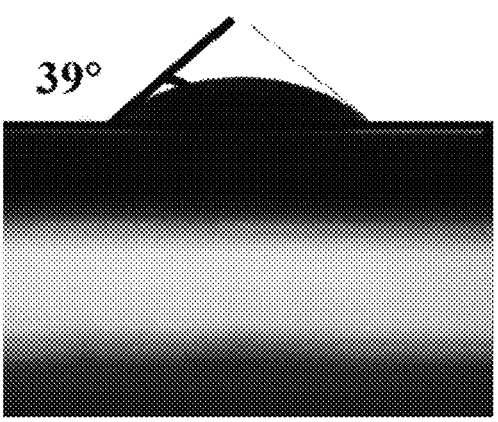
Figure 16B:
FIG. 16B is a static water contact angle of the organic-inorganic hierarchical ZSM-5 prepared in Example 3.
Figure 16B:
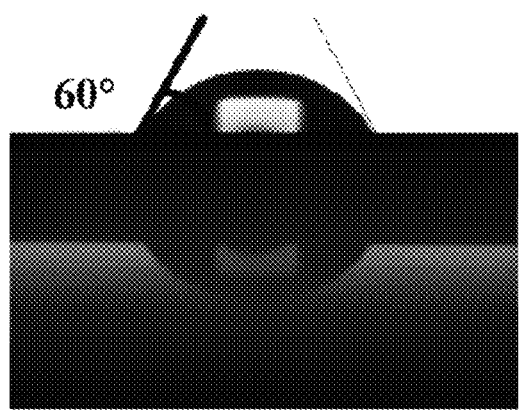
Figure 16C:
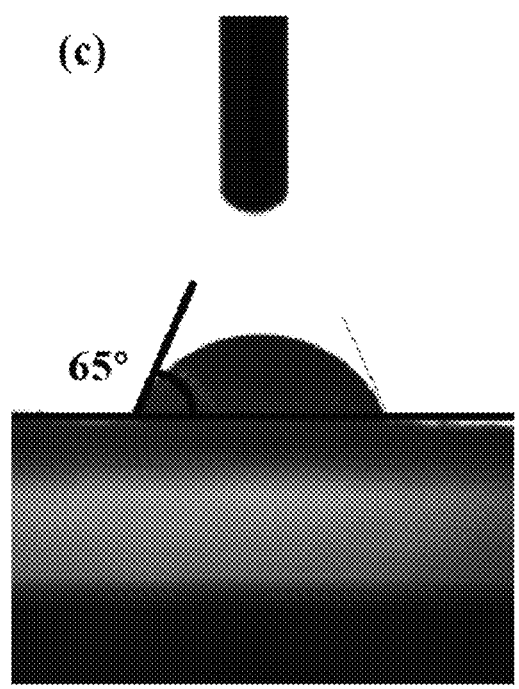
FIG. 16C is a static water contact angle of the organic-inorganic hierarchical ZSM-5 prepared in Example 6.

The hierarchical ZSM-5 prepared in Example 1, the organic-inorganic hierarchical ZSM-5 prepared in Example 3, and the organic-inorganic hierarchical ZSM-5 prepared in Example 6 were subjected to a contact angle test. As shown in FIGS. 16A-16C, it could be obviously observed from FIG. 16A that the hierarchical ZSM-5 prepared in Example 1 had a hydrophobic angle of 39°, it could be obviously observed from FIG. 16B that the organic-inorganic hierarchical ZSM-5 prepared in Example 3 had a hydrophobic angle of 60°, and it could be obviously observed from FIG. 16C that the organic-inorganic hierarchical ZSM-5 prepared in Example 6 had a hydrophobic angle of 65°. The reason for the ZSM-5 molecular sieve was hydrophilic was that the surface thereof was rich in silicon hydroxyl groups, whereas the existing silane modification post-treatment means was to perform a treatment thereon for surface hydrophobicity by grafting the surface thereof with organic hydrophobic groups. This method seriously damaged the pore structure of the material. In the present invention, the organic-inorganic hierarchical ZSM-5 synthesized by in-situ addition of an organosilane successfully provided the surface thereof with the organic hydrophobic group methyl while completely retaining the characteristic pore structure of the material, which was obviously reflected in its contact angle test.

Example 19

Figure 19:
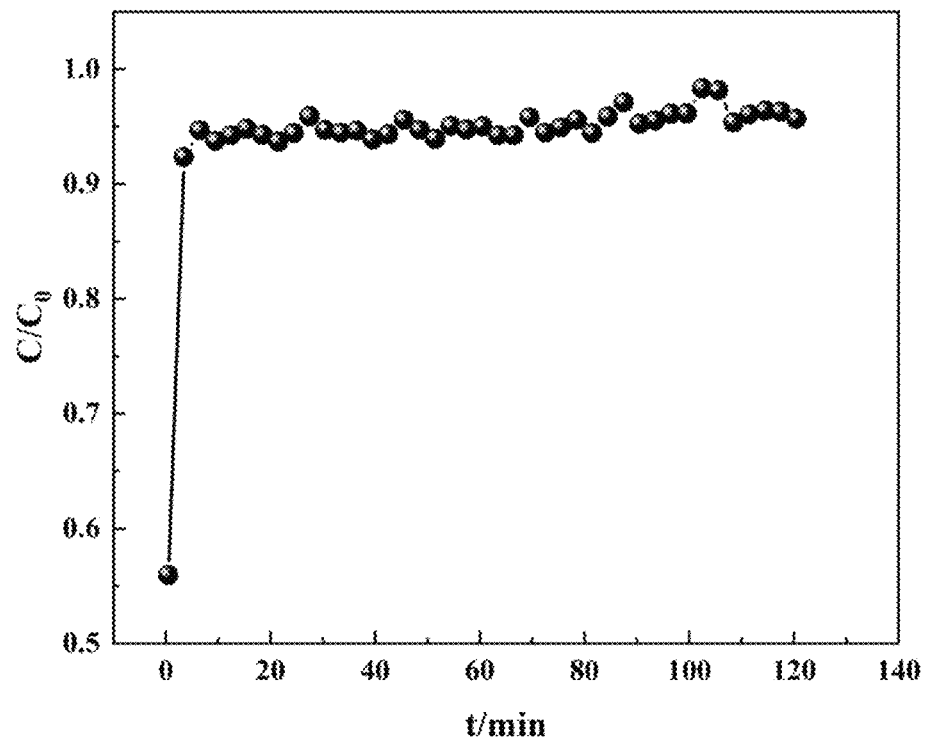
FIG. 19 is a toluene adsorption breakthrough curve of the hierarchical ZSM-5 prepared in Example 1 under humidified condition.

The hierarchical ZSM-5 prepared in Example 1 was subjected to an adsorption test under high-concentration toluene and humidified conditions. The adsorption test method was the same as that in Example 13, only except that the relative humidity was set to 30%. As shown in FIG. 19, when there was water during the toluene adsorption process, the hierarchical ZSM-5 had greatly reduced adsorption performance and lost its original adsorption capacity. This was because the ZSM-5 molecular sieve was very sensitive to water during the adsorption process, so when there was water during the adsorption process, the molecular sieve basically lost its adsorption capacity, and the pore channel structure was blocked by water molecules.

Comparative Example 1

A method for preparing a ZSM-5 molecular sieve, including the following steps:
mixing silicon dioxide, sodium metaaluminate, sodium hydroxide, water, and an organic template agent at a mass ratio of 4:0.2:0.5:50:10, uniformly dispersing the mixture, then placing same in a closed high-temperature and high-pressure hydrothermal reaction kettle, performing an aging reaction at 80° C. for 16 hours and then a crystallization reaction at 180° C. for 72 hours to obtain a ZSM-5 molecular sieve precursor, washing the ZSM-5 molecular sieve precursor with deionized water to neutrality, and finally roasting the molecular sieve precursor at 550° C. for 5 hours to remove the organic template agent to obtain the ZSM-5 molecular sieve.

The use of the organic template agent in the above preparation process led to increased cost and environmental pollution; in addition, the removal of the organic template agent by roasting undoubtedly also increased the energy consumption in the preparation process.

Comparative Example 2

A commercial ZSM-5 molecular sieve purchased from Tianjin Catalyst New Material Technology Co., Ltd.

Figure 17:
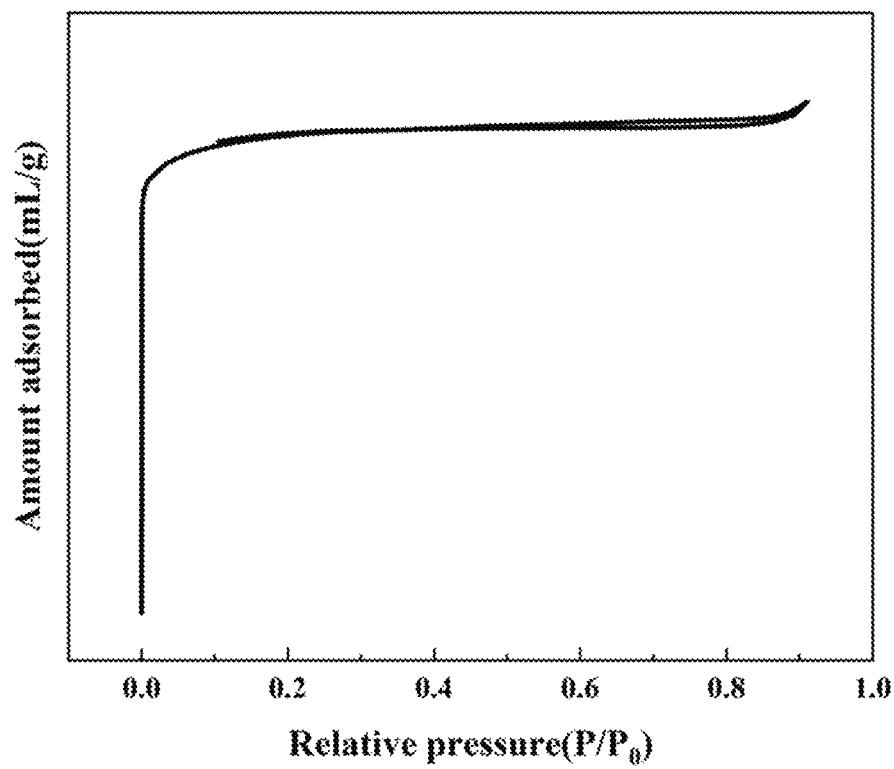
FIG. 17 is a nitrogen physical adsorption-desorption curve of a commercial ZSM-5 molecular sieve of Comparative Example 2.

As shown in FIG. 17, the nitrogen physical adsorption-desorption curve of the commercial ZSM-5 molecular sieve was a typical type-I curve, meaning that it had single uniform micropores. Compared with the nitrogen physical adsorption-desorption curve of the hierarchical ZSM-5 molecular sieve, it had no hysteresis loop.

Comparative Example 3

A method for preparing a ZSM-5 molecular sieve having undergone silane modification post-treatment, including the following steps:

mixing a commercial ZSM-5 molecular sieve, toluene, and a silane coupling agent at a mass ratio of 10:1:0.1, placing the mixture in a three-necked round-bottom flask, condensing and refluxing same at 110° C. for 12 h, washing the obtained product with ethanol, and finally placing the product in an oven and drying same at 110° C. to obtain a modified ZSM-5 molecular sieve.

The use of the organic solvent during the above preparation process involved a high-temperature reaction, which caused environmental and economic problems. In addition, this method caused the collapse of pore channels in the ZSM-5 molecular sieve and lost its original structural characteristics.

The ZSM-5 molecular sieve prepared in Comparative Example 1 and the ZSM-5 molecular sieve having undergone silane modification post-treatment prepared in Comparative Example 3 were subjected to a low-concentration toluene adsorption test under humidified condition. The test method was basically the same as that in Example 11, and in the humidified condition, the relative humidity was set to 10%, 20% or 30%. The test results were as shown in Table 9.

TABLE 9

| | Relative humidity | | |
|---|---|---|---|
| Equilibrium adsorption amount (mg/g) | 10% | 20% | 30% |
| Comparative Example 1 | 49 | 38 | 30 |
| Comparative Example 3 | 56 | 41 | 32 |

The toluene adsorption behavior of the organic-inorganic hierarchical ZSM-5 could be confirmed in previous experimental data (X. Meng, et al. Frontiers in Chemistry, 2019, 7:502), and its adsorption was mainly dependent on physical adsorption, i.e., micropore filling. Since the pore diameter of the organic-inorganic hierarchical ZSM-5 was close to the molecular dynamics diameter of toluene (0.56-0.58 nm) and the pore channel structure of the organic-inorganic hierarchical ZSM-5 was straight channels and Z-shaped channels with an approximately circular cross-section, the two were combined in a crossed manner. Therefore, after toluene molecules entered organic-inorganic hierarchical ZSM-5, they could be trapped in the tortuous channels. Compared with ordinary surface physical adsorption, the adsorption force thereof was stronger.

The present invention has been described above by way of example, and it should be noted that without departing from the core of the present invention, any simple variations, modifications or other equivalent substitutions that can be made by a person skilled in the art without involving any inventive effort all fall within the scope of protection of the present invention.

What is claimed is:

1. A method for preparing an organic-inorganic hierarchical ZSM-5, comprising the following steps:
    S1, mixing a silicon source, an aluminum source, NaOH, and a first water to obtain a first mixture, stirring the first mixture until uniformly dispersed, and drying and grinding the first mixture after uniformly dispersed to obtain a hierarchical ZSM-5 precursor, wherein a ratio of a part by amount (in mol) of a substance of silicon in the silicon source to a part by amount (in mol) of a substance of aluminum in the aluminum source, to a part by amount (in mol) of a substance of the NaOH, to a part by volume (in mL) of the first water is (20-80): (1-4):(0.5-2):(35-55);
    S2, mixing the hierarchical ZSM-5 precursor, sodium silicate, a seed, ethanol, and a second water to obtain a second mixture, and uniformly dispersing the second mixture to obtain a crystallized solution, wherein in parts by mass, a ratio of the hierarchical ZSM-5 precursor to the sodium silicate to the seed to the ethanol and to the second water in the S2 is (1.5-3):(0.3-0.6): (0.06-0.12):(10-20):(30-60), wherein the seed is a ZSM-5 molecular sieve; and
    S3, mixing the crystallized solution with a hydrolyzed organosilane to obtain a resulting solution, subjecting the resulting solution to a hydrothermal crystallization at 160-180° C. for 48-72 h to obtain a product, and washing and drying the product to obtain the organic-inorganic hierarchical ZSM-5, wherein in parts by mass, a ratio of the hydrolyzed organosilane to the hierarchical ZSM-5 precursor in the crystallized solution is (1-10):(1-7); and an organosilane is hexamethyldisilazane and/or methyltriethoxysilane, the hydrolyzed organosilane is obtained by hydrolyzing the organosilane for 2-4 h, and a method for obtaining the hydrolyzed organosilane comprises: mixing 0.5-3 parts by mass of the organosilane with 8-15 parts by volume of a third water to obtain a third mixture, and stirring the third mixture at 20-30° C. for 2-4 h, wherein a unit of the parts by mass is g, and a unit of the parts by volume is mL.

2. The method for preparing the organic-inorganic hierarchical ZSM-5 according to claim 1, wherein in the S1, a drying temperature is 60-100° C., and a drying time is 12-16 h.

3. The method for preparing the organic-inorganic hierarchical ZSM-5 according to claim 1, wherein in the S3, a detergent used for the washing is a mixture of an alcohol and a fourth water.

4. The method for preparing the organic-inorganic hierarchical ZSM-5 according to claim 1, wherein in the S3, a drying temperature is 60-105° C.

* * * * *